(12) United States Patent
Tack et al.

(10) Patent No.: US 11,824,826 B2
(45) Date of Patent: *Nov. 21, 2023

(54) SYSTEM AND METHOD FOR MULTI-CHANNEL GROUP COMMUNICATIONS

(71) Applicant: Twilio Inc., San Francisco, CA (US)

(72) Inventors: Andres Jaan Tack, Tallinn (EE); Sipan Babertsyan, Tallinn (EE); Mihkel Sarv, Tallinn (EE)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,796

(22) Filed: Sep. 15, 2021

(65) Prior Publication Data

US 2022/0006771 A1 Jan. 6, 2022

Related U.S. Application Data

(63) Continuation of application No. 16/839,981, filed on Apr. 3, 2020, now Pat. No. 11,153,258.

(Continued)

(51) Int. Cl.
*H04L 51/56* (2022.01)
*H04L 51/043* (2022.01)
(Continued)

(52) U.S. Cl.
CPC ............ *H04L 51/56* (2022.05); *H04L 51/043* (2013.01); *H04L 51/214* (2022.05); *H04L 51/216* (2022.05); *H04L 51/42* (2022.05)

(58) Field of Classification Search
CPC ...... G06Q 10/10; G06Q 10/103; H04L 45/74; H04L 65/403; H04L 51/046; H04L 51/14;
(Continued)

(56) References Cited

U.S. PATENT DOCUMENTS 6,785,708 B1 * 8/2004 Busey ................. H04L 12/1813
709/227
7,130,921 B2 10/2006 Goodman et al.
(Continued)

FOREIGN PATENT DOCUMENTS

EP 1229443 B1 3/2007
WO WO-2021025733 A1 2/2021

OTHER PUBLICATIONS

"U.S. Appl. No. 16/839,981, Examiner Interview Summary dated Mar. 12, 2021", 2 pgs.
(Continued)

*Primary Examiner* — Sargon N Nano
(74) *Attorney, Agent, or Firm* — Lowenstein Sandler LLP

(57) ABSTRACT

A system and method for multi-channel communications that includes receiving an initiating communication triggering establishment of a conversation associated with a set of participant endpoints, wherein the set of participant endpoints comprises of participant endpoints from at least two distinct communication channels; configuring a set of intermediary endpoints for communications between at least a subset of the set of participant endpoints on different communication channels; and for each communication of the conversation, transmitting communications to a receiving set of participant endpoints through the configured intermediary endpoint.

20 Claims, 22 Drawing Sheets

Related U.S. Application Data

(60) Provisional application No. 62/882,807, filed on Aug. 5, 2019.

(51) Int. Cl.
*H04L 51/216* (2022.01)
*H04L 51/42* (2022.01)
*H04L 51/214* (2022.01)

(58) Field of Classification Search
CPC ......... H04L 51/36; H04L 51/16; H04L 51/04; H04L 51/08; H04L 51/043; H04L 51/22; H04L 51/56; H04L 51/42; H04L 51/216; H04L 51/214
See application file for complete search history.

(56) References Cited

U.S. PATENT DOCUMENTS

| | | | | |
|---|---|---|---|---|
| 7,308,093 | B2 * | 12/2007 | Annadata | H04M 3/523 |
| | | | | 379/265.09 |
| 7,787,605 | B2 * | 8/2010 | Rodman | H04L 12/4625 |
| | | | | 379/202.01 |
| 8,436,889 | B2 * | 5/2013 | Eleftheriadis | H04N 21/4316 |
| | | | | 348/14.09 |
| 8,539,097 | B2 | 9/2013 | Maes | |
| 8,890,925 | B2 | 11/2014 | Weiser et al. | |
| 8,934,381 | B2 * | 1/2015 | Rodman | H04M 11/06 |
| | | | | 370/261 |
| 10,686,902 | B2 | 6/2020 | Muller et al. | |
| 11,348,074 | B2 * | 5/2022 | Romano | H04L 65/403 |
| 11,412,015 | B1 * | 8/2022 | Aichinger | H04L 65/403 |
| 11,489,684 | B2 * | 11/2022 | Lin | H04L 12/1822 |
| 2002/0106998 | A1 * | 8/2002 | Presley | H04M 3/567 |
| | | | | 455/403 |
| 2006/0274869 | A1 * | 12/2006 | Morse | H04L 67/04 |
| | | | | 707/E17.121 |
| 2006/0282515 | A1 * | 12/2006 | Tian | H04L 67/535 |
| | | | | 709/219 |
| 2007/0225024 | A1 | 9/2007 | Li | |
| 2009/0113077 | A1 | 4/2009 | Dahlen | |
| 2010/0034143 | A1 | 2/2010 | Cordeiro et al. | |
| 2010/0165976 | A1 | 7/2010 | Khan et al. | |
| 2011/0032912 | A1 | 2/2011 | Cordeiro et al. | |
| 2011/0044184 | A1 * | 2/2011 | Balasaygun | H04L 67/306 |
| | | | | 370/252 |
| 2013/0147900 | A1 | 6/2013 | Weiser et al. | |
| 2013/0147902 | A1 | 6/2013 | Weiser et al. | |
| 2013/0152153 | A1 | 6/2013 | Weiser et al. | |
| 2014/0065969 | A1 * | 3/2014 | Choi | H04W 76/14 |
| | | | | 455/41.2 |
| 2014/0237015 | A1 * | 8/2014 | Bruins | H04W 52/0209 |
| | | | | 709/201 |
| 2015/0304253 | A1 * | 10/2015 | Lee | H04L 65/611 |
| | | | | 709/206 |
| 2015/0304254 | A1 * | 10/2015 | Arai | H04L 51/214 |
| | | | | 709/206 |
| 2016/0094496 | A1 * | 3/2016 | Dietz | H04L 65/1069 |
| | | | | 709/206 |
| 2016/0149839 | A1 * | 5/2016 | Yi | H04L 51/04 |
| | | | | 709/206 |
| 2016/0173419 | A1 * | 6/2016 | Mendiola | H04L 51/214 |
| | | | | 709/206 |
| 2016/0182524 | A1 * | 6/2016 | Khosravi | H04L 12/5692 |
| | | | | 726/1 |
| 2016/0285799 | A1 * | 9/2016 | Andreev | H04L 51/02 |
| 2016/0031591 | A1 | 10/2016 | Kaufman | |
| 2016/0380931 | A1 * | 12/2016 | Sircar | H04L 51/063 |
| | | | | 709/206 |
| 2017/0324628 | A1 | 11/2017 | Dhanabalan | |
| 2018/0198838 | A1 | 7/2018 | Murgia et al. | |
| 2019/0199658 | A1 * | 6/2019 | Kim | H04L 51/02 |
| 2020/0348829 | A1 * | 11/2020 | Fay | G06N 20/00 |
| 2021/0044561 | A1 | 2/2021 | Tack et al. | |
| 2021/0099387 | A1 | 4/2021 | Goel | |
| 2022/0141260 | A1 * | 5/2022 | Yao | H04L 65/1069 |
| | | | | 709/206 |
| 2022/0182428 | A1 * | 6/2022 | Roedel | G06F 3/017 |

OTHER PUBLICATIONS

"U.S. Appl. No. 16/839,981, Non Final Office Action dated Nov. 23, 2020", 16 pgs.

"U.S. Appl. No. 16/839,981, Notice of Allowance dated Jun. 15, 2021", 22 pgs.

"U.S. Appl. No. 16/839,981, Response filed Mar. 23, 2021 to Non Final Office Action dated Nov. 23, 2020", 14 pgs.

"International Application Serial No. PCT/US2020/026666, International Search Report dated Jun. 29, 2020", 2 pgs.

"International Application Serial No. PCT/US2020/026666, Written Opinion dated Jun. 29, 2020", 8 pgs.

* cited by examiner

```
Conversation conv = Platform.Conversations.creator(
    Map.of(
        "messaging_group_mode": "native"
    )
).create();

// Chat participant #1 (financial advisor)
Participant.creator()
    .setConversationSid("COxx")
    .setMessagingBinding(Gson.Serialize(
      Map.of(
         "type": "chat",
         "address": "identity-of-fa1",
         "projected_address.sms": "+1 415 555 2442"
      )
    ))
    .create();

// Chat participant #2 (financial advisor 2)
Participant.creator()
    .setConversationSid("COxx")
    .setMessagingBinding(Gson.Serialize(
      Map.of(
         "type": "chat",
```

*Fig. 9A*

```
        "address": "identity-of-fa2",
        "projected_address.sms": "+1 212 555 4879"
      )
    ))
    .create();

// A wealth-management client actually connected over group MMS
Participant.creator()
    .setConversationSid("COxx")
    .setMessagingBinding(Gson.Serialize(
      Map.of(
        "type": "sms",
        "address": "+1 555 591 4879"
      )
    ))
    .create();
```

SYSTEM AND METHOD FOR MULTI-CHANNEL GROUP COMMUNICATIONS

CROSS-REFERENCE TO RELATED APPLICATIONS

This application is a continuation of U.S. patent application Ser. No. 16/839,981, filed on 3 Apr. 2020, which claims the benefit of U.S. Provisional Application No. 62/882,807, filed on 5 Aug. 2019, which are incorporated in their entireties by this reference.

TECHNICAL FIELD

An embodiment of the present subject matter relates generally to the field of message communication and, more specifically, to a new and useful system and method for multi-channel group communications.

BACKGROUND

There has been an increase in the usage of text and media chat messaging as a form of communication. In particular, businesses and professionals are using messaging as a means for engaging with customers, users, clients, partners, employees, and the like. This is creating a shift in communication for a wide range of industries and types of businesses like financial services, real estate, medicine, logistics, small businesses, and others.

The growing importance of text and media communications has been partly driven by the rise of proprietary communication channels sometimes referred to as "over the top" (OTT) communication channels. Examples of OTT communication channels include social network messaging services, dedicated private messaging applications, and/or other communication services. OTT communication channels typically have their own client/user addressing scheme and facilitate communication using other network services such as Transmission Control Protocol (TCP) and the Internet Protocol (IP) communication.

The growing popularity of OTT and other messaging/communication options has resulted in a fracturing of users across different communication channels. For example, connecting multiple users over text messaging can be challenging when the users are not all accessible over a common communication channel. Furthermore, the capabilities of the various communication channels vary. For example, some of the advanced features that are available on one communication channel may not be available on another communication channel. Even when a feature is generally available on multiple communication channels, the feature's implementation and details can vary across different communication channels. These issues become even more problematic when using increasingly flexible forms of communication such as group chat. Traditionally, group chat has been available when each participant is available over a single communication channel.

Thus, there is a need in the message communication field to create a new and useful system and method for multi-channel group communication. This invention provides such a new and useful system and method.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 9A and FIG. 9B is an exemplary API call in configuring participants of a conversation resource;

DETAILED DESCRIPTION

Figure 1:
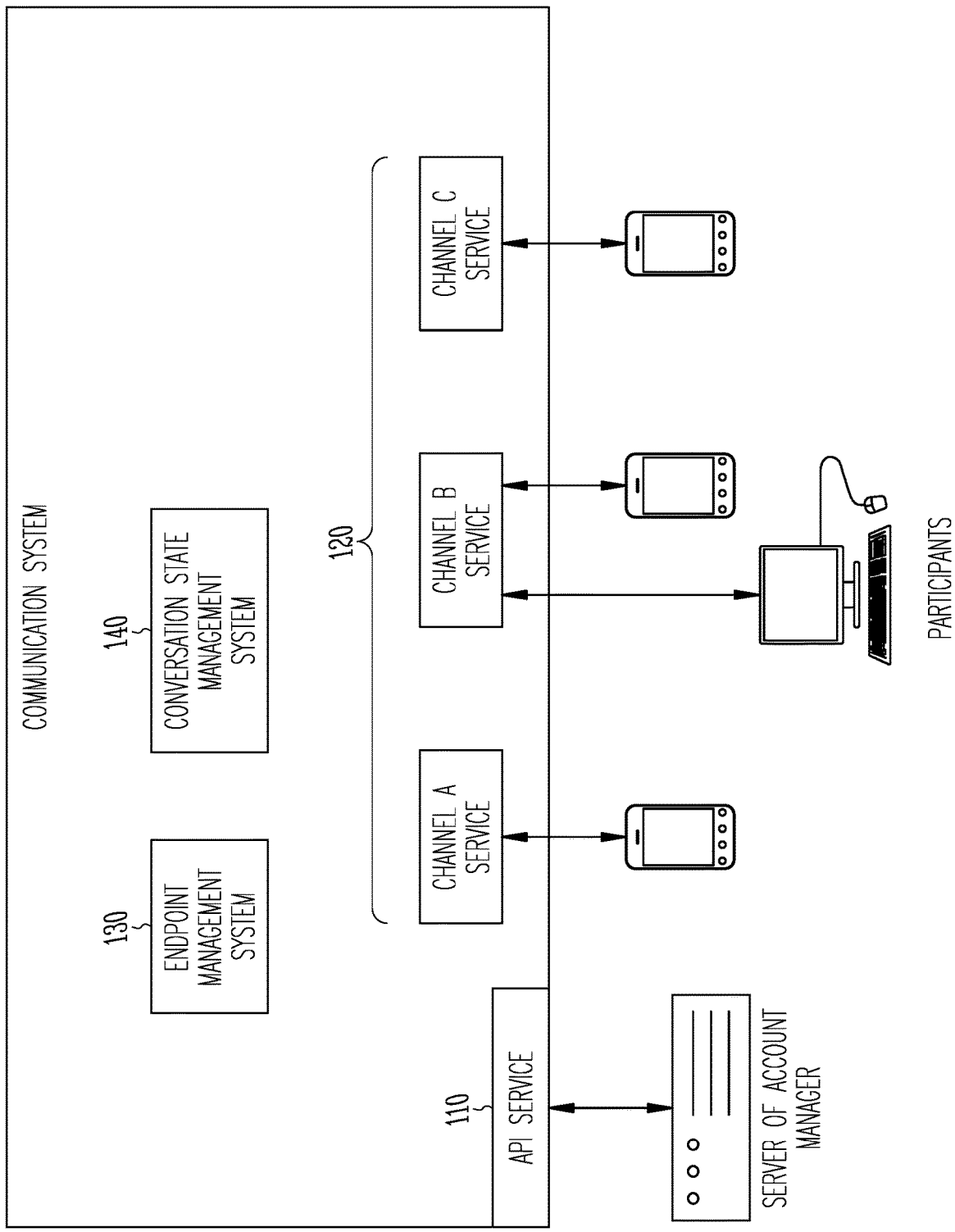
FIG. 1 is a schematic representation of a system of an embodiment.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for multichannel group communications.

Overview

A system and method for multi-channel group communications of a preferred embodiment function to facilitate communications of multiple participants (e.g., two or more clients) using two or more different communication channels. The system and method preferably address various challenges such as addressing, media management, interaction/feature normalization, managing participant/channel state for some select channels, and/or other addressing other issues present when connecting multiple users that are communicating through two or more different communication channels.

The system and method are preferably used in managing asynchronous communications such as text or media communications, which are sometimes referred to as forms of "chat" communication. The system and method may additionally or alternatively be used in managing other forms of communication such as synchronous communications like voice and video communications using PSTN, SIP, WebRTC, and/or alternative IP media communication networking mediums.

In supporting multi-channel communications, the system and method can bridge communications across two or more communication channels. For example, a first subset of participants may be using a first communication channel while a second and third subset of participants are using a second and third communication channel. The different communication channels may have their own communication protocols, requirements, capabilities, and/or limitations. The method and system preferably unify communications across multiple channels such that communication from external participants appears "native" to the communication channel. In effect, the system and method coordinate multiple group conversations in distinct communication channels where participant presence in each channel may be simulated through use of intermediary endpoint and communication processing. In some variations, unifying communications may approximate and/or omit various features between communication channels. While, the system and method can preferably enable multi-channel communications, some instances of use of the system and method may also serve and be capable of facilitating communications using a single channel.

In one example, a multi-channel group communication could include two participants connecting over an IP-based chat communication protocol and another set of participants using an OTT/social network communication channel. In another example, a multi-channel group communication could include one participant using SMS, a second using MMS, a third using IP-based chat communication protocol, and a fourth using a social network messaging service. The system and method can preferably support a wide variety of participant communication topologies involving different combinations of various communication channels each possibly having varying number of participants.

In supporting group communications, the system and method can preferably facilitate communication for groups of an arbitrary number of participants. For example, the group may include three, ten, a hundred, a thousand, or even more participants. The system and method could additionally support smaller groups of participants, and in some instances of use may even support a group of one or two participants.

The system and method can use various forms of addressing systems that function to facilitate connecting a participant to different communication channels. The system and method preferably orchestrate participant endpoint management to enable participants to communicate as native participants and to be addressable across different channels despite their use of a different communication channel.

The system and method can additionally employ media management, which functions to appropriately translate media between different communication channels. Various communication channels may have different content format requirements and/or limitations. The content sent from one participant may be translated and/or otherwise modified for delivery to each of the other conversation participants depending on the communication channel used for each participant.

The system and method can additionally normalize various interactions and features such that they translate between communication channels. For example, typing indicators (e.g., an indicator that composing of a message is in-progress), delivery receipts (e.g., confirmation of a communication being delivered), and read receipts (e.g., confirmation of a communication having been viewed/accessed) may be made available and updated appropriately for different communication channels.

The system and method may additionally manage participant and messaging state. In some communication channels, a communication session (e.g., a conversation) may have state. For example, a conversation involving business communications between a business participant and a customer participant may have a window during which the conversation is active. The active state may depend on the customer participant interactions. State may be monitored and communications of this conversation appropriately coordinated in synchronization with the state of the conversation.

In one implementation, the system and method may be implemented in connection with a media communication developer tool or service wherein the communication developer service facilitates and manages communications on behalf of another service. For example, a multitenant communication-as-a-service platform may use the system and method to offer a chat conversation service that can be used by various outside applications or services to enable multi-channel group communications. In this way, an outside developer may use the system and method to add multi-channel group communications within their application/service.

In an alternative implementation, the system and method may be implemented for a particular communication service. In this variation, the system and method may operate as a single-tenant solution. For example, one computer-implemented service may implement the system and method to enable multi-channel group communications within their computer-implemented service.

The system and method may be used in a variety of situations. Multi-channel group communications can be particularly useful in various customer service scenarios. The ability to allow one or more customers to engage in conversation using a communication channel of their choice can make the system and method particularly attractive to businesses wishing to connect with their customers. In one example, multiple customer service agents may participant in a single conversation with a customer where the customer service agents use one communication channel and the customer uses a second communication channel. Furthermore, the system and method may enable dynamic participation within group communications for some instances of conversations. This may be useful in a business setting, for example, where there may be various scenarios where it could be useful to add a participant to a group communication and/or to drop a participant from a group communication.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method may enable interoperability of multiple channels in conversations involving arbitrary sized groups. As a related benefit, by offering multi-channel support, participants may engage in conversations using a preferred communication channel. This may enable a participant to consolidate their personal conversations to one or a few communication channels that they select based on personal preferences. In the context of a business communicating with various customers, the business can have their representatives using their own preferred communication channel without having their customers use the same communication channel. This can result in an enhanced customer experience as each customer receives communication in a mode that they prefer.

As another potential benefit, the system and method may translate communications such that various advanced features can be enabled and translated across multiple communication channels. Various communication channels have different capabilities. The system and method may preserve a user-experience of the participants where all such capabilities are fully available and appropriately communicated to the other participants. Some of the features may be communication features where different types of communications can be sent. Some of the features may be more interactive features of the communication channel such as typing indicators, read or delivery receipts, and the like. Similarly, participants on more limited communication channels may be enabled to engage in conversations that work around the limitations.

As another potential benefit, the system and method may offer more seamless participation in a group. Participants may be added and removed as appropriate, which can be invaluable for business applications. Additionally, seamless updates of participants may further extend use-cases where automated systems or bots can be actors in conversations.

A communication channel as used herein characterizes a communication protocol and/or ecosystem through which messages and/or media is communicated. A communication channel may be defined through a communication standard such as SMS and MMS. A communication channel could alternatively include a proprietary standard and/or communication infrastructure. Such proprietary or third-party communication channels can be internet protocol (IP) based communication channels that may make use of an application programming interface (API), a communication protocol, or other mechanisms for communicating. For example, a social network messaging system may serve as a communication channel.

A participant as used herein characterizes the actor or entity engaging in communication. The participant may take on a variety of roles depending on the use case. For example, the participant could be a business representative or a customer. Additionally, the participant is not limited to human participants and may include automated systems such as a chat bot or an alternative type of agent used to generate communications, respond to communications, and/or otherwise engage in communications. A participant will engage in communications using a client that is addressed at a client endpoint.

A client as used herein characterizes a device/system instance through which a participant preferably engages with a communication channel. A client could be a telephone connected to a telephony network. A client could be an application operable on a personal computing device. In one example, the application is a native application operable on a smart device (e.g., a smart phone, smart watch, etc.) or computer. In another example, the application is a web application running within a website/browser/webview. A client will generally have at least one client endpoint, which is used to reference the origin and/or destination address of communications. Each participant will preferably have at least one client through which the participant can participant in group communications. In some instances, a participant may have multiple distinct clients through which a participant participates with a group communication.

A client endpoint as used herein characterizes an identifier for a particular client. A client endpoint is preferably associated with a participant. In some cases, a client endpoint can be associated with multiple clients. For example, a participant logged into a messaging application on multiple devices may be reachable using a shared endpoint. In other variations, a client endpoint may be uniquely associated with a particular client instance. A client endpoint could be a telephone number, an email address, a user name, an account identifier, and/or any suitable endpoint identifier.

System

As shown in FIG. 1, a system for multi-channel group communications of a preferred embodiment can include a communication system 100 that includes an application programming interface service 110, and a set of communication channel services 120. The system may additionally include an endpoint management system 130 and/or a conversation state management system 140.

The communication system 100 functions to coordinate communications between different communication channels and participants. The communication system 100 preferably bridges multiple communication channels and coordinates communicating between those channels.

The communication system 100 in one preferred variation is implemented for use as a multi-tenant service whereby different account managers (e.g., developer accounts) may integrate multi-channel group communication conversation services into different applications and services. Data, usage tracking, security, logs, API resources (e.g., conversation logs, participant records, etc.) are scoped for use by that account manager for each integration instance. Additionally, each account within a multi-tenant communication service 100 may itself have a sub-account. Accordingly, an account may support multiple communication conversations for different sub-account holders wherein communication, data/analytics, billing, and/or other aspects can be scoped to an account, a sub-account, or any suitable scope.

The communication service 100 is preferably implemented as a cloud-hosted platform. The communication platform can be a server, a server cluster, a collection of components on a distributed computing system, or any suitable network accessible computing infrastructure.

Herein, the system is primarily described as it may be used for multi-tenant use, but the system is not limited to multi-tenant use and may be implemented for use by a single operator.

The application programming interface (API) service 110 functions as a programmatic mechanism through which external entities can manage communication conversations.

The API service 110 is preferably a RESTful API but may alternatively be any suitable API such as SOAP, GraphQL, or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as API endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. Information about a conversation is preferably stored and made accessible through conversation API resources. Alternative types of APIs may use different approaches for organization programmatic interactions with the communication system 100.

While various approaches may be used, the API service 110 can preferably expose a set of different type of programmatic resources through which communication conversations may be created, updated, viewed, and/or otherwise managed. In one implementation, the set of conversation API resources can include conversation resources, participant resources, and interaction resources. Various architectures of conversations can alternatively be used.

A conversation resource functions to represent a communication session between a set of participants. A conversation resource is preferably created for each communication session between two or more participants that makes up a conversation. A conversation or a "communication thread", preferably characterizes a set of communications that may be organized sequentially in time. After the conclusion of a conversation, the conversation resource can be closed. However, a conversation resource could be kept active indefinitely. A conversation resource can have a conversation start and end time. The conversation resource will preferably have at least two associated participant resources. The conversation resource can have associated interaction resources that represent instances of communication to and/or from the participants (e.g., text and media messages).

A participant resource functions to represent a participant in a conversation and how to reach that participant. A participant resource preferably includes properties that define an endpoint address, a communication channel type, and/or any other properties needed to establish communications with the participant. In some variations, participant information such as name, language, location, role, and/or other properties can be specified. In some variations, a client endpoint is used to specify an address of an accessible communication channel, and optionally one or more intermediary endpoints may be specified to indicate endpoints used in representing the address of the participant in other communication channels. An intermediary endpoint can be the endpoint that other participants will see when receiving communications from that participant. The account holder could set the intermediary endpoint (e.g., a projected endpoint) during programmatic interaction with the participant resource. Alternatively, the associated intermediary endpoint could be automatically selected. In some cases, an intermediary endpoint may not be needed if the participant can be adequately represented in a particular communication channel.

An interaction resource functions to represent communication exchanges to and/or from participants. An interaction resource may alternatively be referred to as a "message" resource. Though, in some variations, non-message communications such as voice or video calls may be part of a conversation resource. Some interaction resources may include media, supplementary metadata such as delivery status, and/or read-receipts. A conversation resource can have multiple interaction resources that together represent the conversation (i.e., the communication session). One interaction resource can represent a single communication in the conversation. Alternative representations of communications (inbound and outbound) may be used.

The set of communication channel services 120 functions to provide an interface to a plurality of different communication channels. A communication channel service preferably exists for each external communication channel of the communication system 100. Preferably, the communication channels may include SMS, MMS, IP messaging, OTT messaging (e.g., third party messaging apps, social network messaging networks, etc.) email, and/or other suitable messaging communication channels. As discussed, the communication channels may additionally include synchronous forms of communication and as such, the set of communication channels may include the PSTN calls, SIP calls, IP video sessions, and/or other suitable types of synchronous communications. Other communication channels may alternatively or additionally be used.

Each communication channel accessible by the system preferably includes a communication channel service that includes a communication channel API engine that is configured to interface with the communication channel: send communications; receive communications; read state of a participant, conversation, or communication; and/or otherwise interact with the communication channel. In other scenarios where a communication channel is accessed in other ways, the communication service 120 may include other suitable configuration to interact and communicate with the communication channel.

In some cases, the communication system 100 may include a native communication channel such as an IP chat service that is managed internally by the communication system 100. An internal API may be used for interfacing with the communication system 100. Alternatively, the native communication channel may be controlled in any suitable manner. A native communication channel may be treated differently from other communication channels. For example, intermediary endpoints of other participants could be handled differently such as by representing them by an identifier generated from the channel and the channel participant identifier. In other variations, a native communication channel can be offered through programmatic interface to the conversation API resources described above.

Additionally, the system may include a channel normalization module for each of the communication channel services—preferably as part of the communication channel service but alternatively as a distinct service of the system. The channel normalization module functions to maintain and manage translation of native channel communications and interactions to a format compatible for other communication channels. In one variation, all communications and interactions are normalized to a default representation that can be used to generate communications for other communication channels. In another variation, a channel normalization module will selectively translate communications and interactions based on channel-to-channel rules. For example, a channel normalization module may include one set of channel-to-channel rules for translating communications between OTT channel A and OTT channel B, and have a second set of channel-to-channel rules for translating communications between OTT channel A and SMS channel C.

A channel normalization module can configure processes applied to media, special interactive features (e.g., typing indicators, read receipts, ad delivery receipts), participant presence information, and the like.

The system can additionally include an endpoint management system 130, which functions to manage endpoints usable for different participants in different channels. In general, the endpoint management system 130 manages a set of intermediary endpoints that can be used as a representation of the endpoint of a participant using a different communication channel. To a first participant communicating with the intermediary endpoint, it appears that the intermediary endpoint is simply an endpoint for a second participant, an endpoint that is native to the communication channel of the first participant. Similarly, the second participant may be communicating with an intermediary endpoint of the first participant within the communication channel of the second participant.

Figure 2:
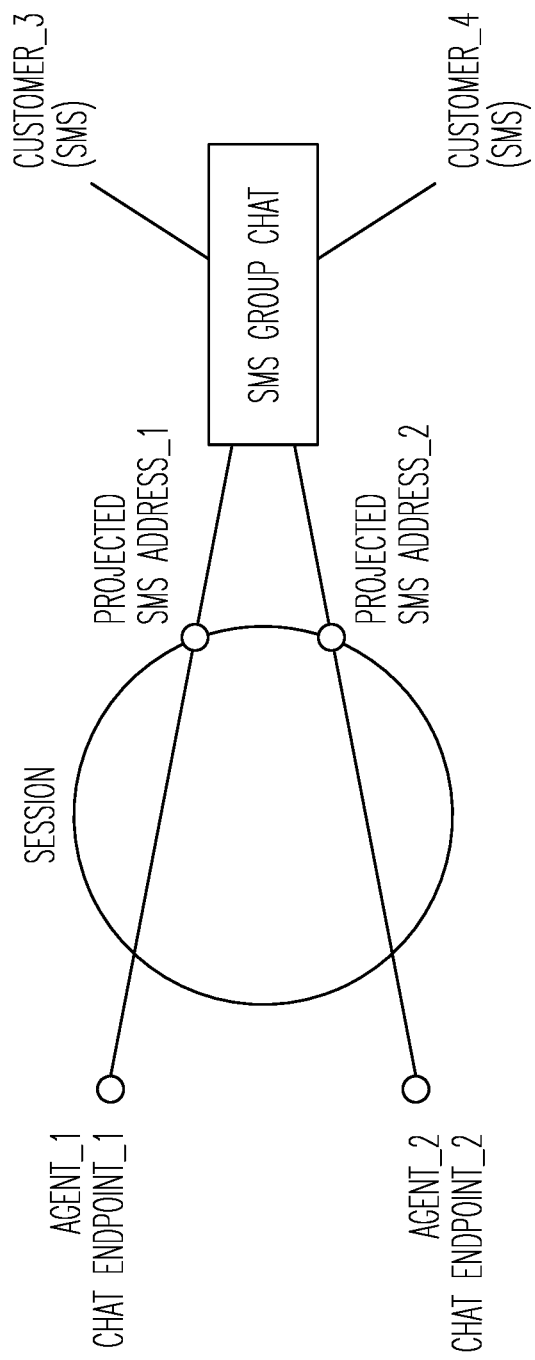
FIG. 2 is a schematic representation of the use of intermediary endpoints in multi-channel communications.

In one variation, an intermediary endpoint may be a projected endpoint (e.g., an endpoint "facade"), where the participant identity may be uniquely paired to the projected endpoint. As shown in the example topology of FIG. 2, two chat participants (e.g., Agent 1 and Agent 2) each have SMS projected intermediary endpoints used to communicate with two other SMS endpoints of the other chat participants (e.g., Customer 3 and Customer 4). In some cases, the projected endpoint may be paired to a participant for a given participant pairing or grouping. Users may share a projected endpoint with others, but communications directed to that endpoint are routed through the system to an actual client address used by the participant. A user may have projected endpoints for multiple different communication channels. In the example topology shown in FIG. 2, each chat participant is associated with a unique endpoint. As a result, messages originating from Agent 1 appear to be originating from a different endpoint (e.g., Projected SMS Address 1) than messages originating from Agent 2 (e.g., Projected SMS Address 2).

A projected endpoint may be used in cases where a channel does support group communications (i.e., a group-enabled communication channel). Out of channel participants will preferably have an assigned projected endpoint. The projected endpoint is preferably bound to a participant such that a participant can appear as a unique user on another channel of communication. The projected endpoint can be unique. In some variations, the projected endpoint may not be globally unique and may be partially shared. In one implementation of sharing a projected endpoint, a projected endpoint may be uniquely associated with a participant for one particular group communication, where the group communication may be defined by the set of participants, a session/conversation identifier, or any suitable properties. In one variation, two participants will generally not share a projected endpoint in the same conversation, and the projected endpoint will preferably be unique for endpoint pairings of the involved participants. However, in some variations, two or more participants may share a projected endpoint within the same conversation. In this variation, two or more participants may be represented by one projected endpoint in the group of a channel of the projected endpoint. A projected endpoint in some implementations may be reused across multiple different conversations. For example, a projected endpoint may be reused within an account scope for two non-overlapping groups of participants.

Figure 3A:
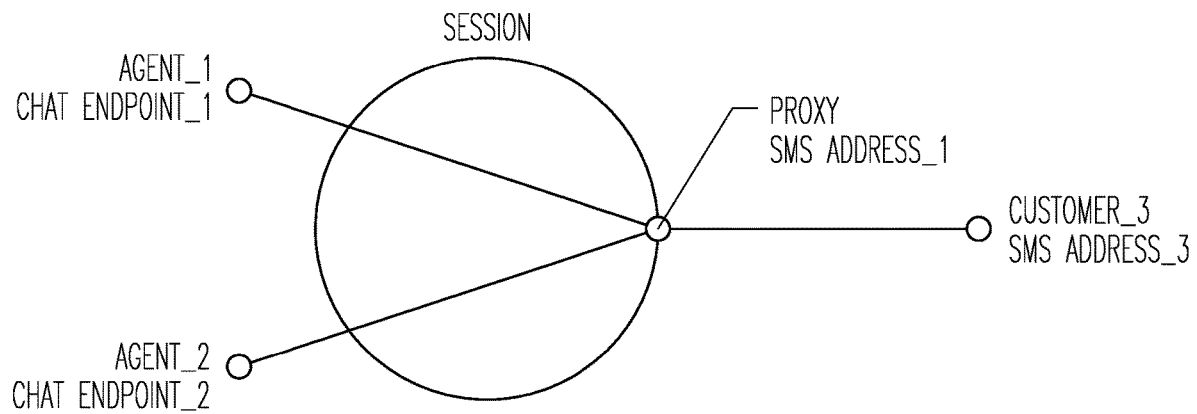
FIGS. 3A and 3B are schematic representations of the use of a shared proxy endpoints in multi-channel communications.
Figure 3B:
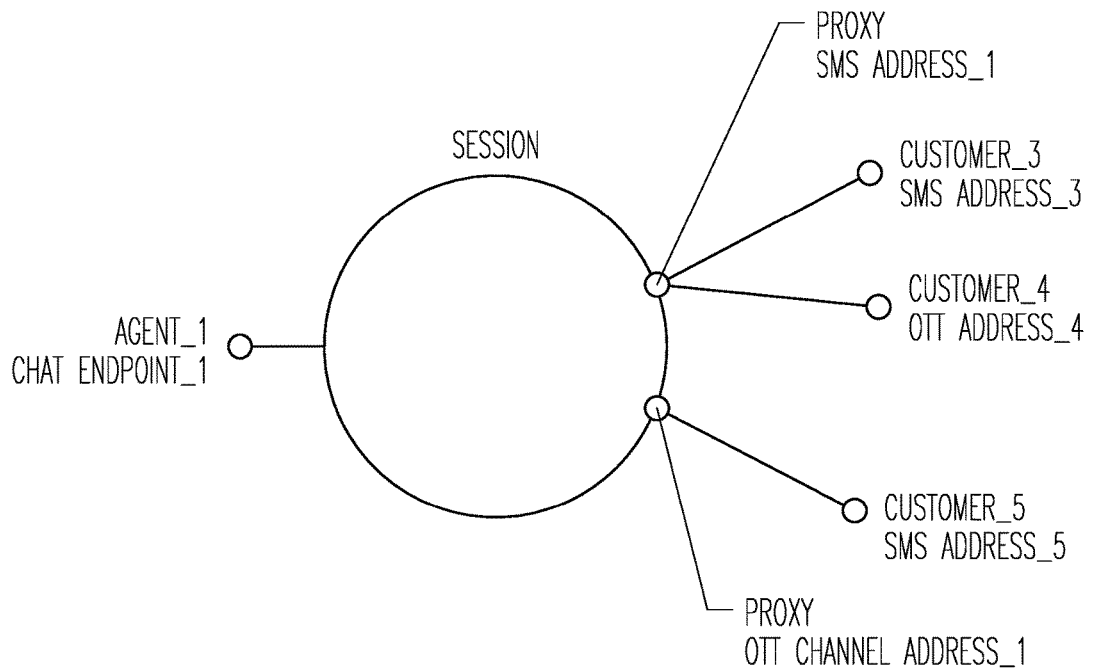

In another variation, an intermediary endpoint may be a proxy endpoint. A proxy endpoint may be shared across multiple participants when those participants are to communicate as a merged representation of a participant. For example, a business may have multiple agents engaging with a customer at different times through a shared proxy endpoint as shown in FIG. 3A. In some cases, identity of a participant may not be associated with the proxy endpoint wherein the proxy endpoint is used to represent the endpoint of the participant for that communication channel. A proxy endpoint is generally used and selected to act as the destination endpoint to which one participant can communicate with one or more other participants. For example, the proxy endpoint is the endpoint to which one or more participants of a group-limited communication channel communicate with to interact with one or more other participants on other communication channels. In some variations, a proxy endpoint can act as an anonymizing endpoint to which general identity information may be attached (e.g., business name). In this type of embodiment, messages originating from both Agent 1 and Agent 2 appear to be originating from a single endpoint (e.g., Projected SMS Address 1). Distinct channel-specific projected endpoint addresses may be used for different channels as shown in FIG. 3B.

Figure 4:
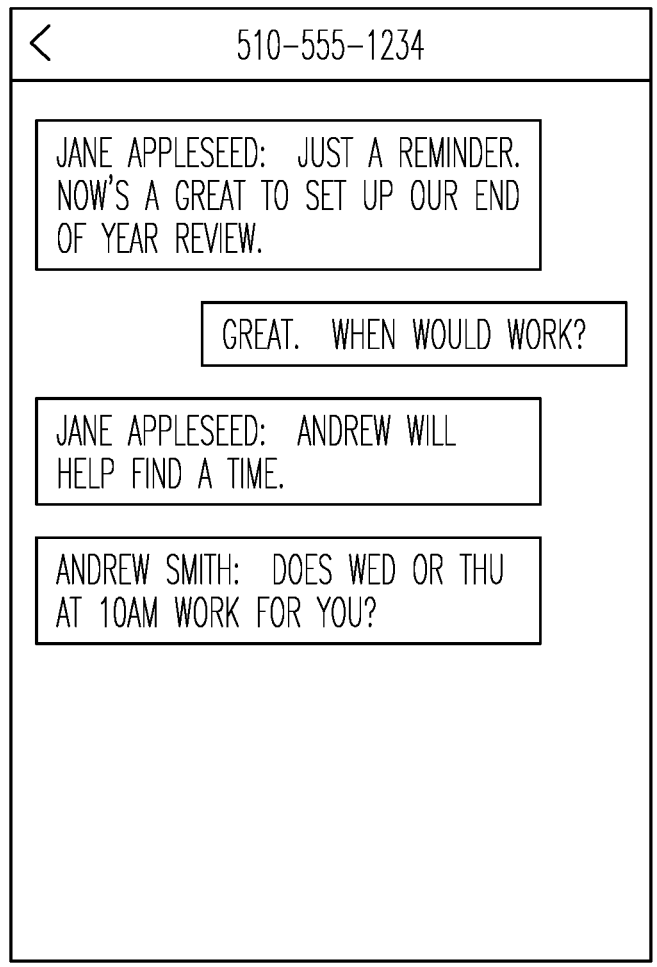
FIG. 4 is an exemplary screenshot of communications of a client device where communications from a proxy endpoint are annotated with participant identifiers.

A shared proxy may be used when a group communications is not supported or not available for a particular channel or is otherwise limited (i.e., a group-limited communication channel). For example, if group SMS is not supported and individual SMS (e.g., SMS chat between A and B) is used, a shared proxy endpoint can be used so that the participant on SMS can communicate with a plurality of participants on SMS and/or other communication channels. In one implementation, a proxy endpoint is associated with each individual SMS endpoint (or other suitable type of channel endpoint). All communications with that SMS endpoint are preferably directed through the proxy endpoint of that particular SMS endpoint. Communications from multiple participants may be identified and communicated through the proxy endpoint. In one implementation, a participant identifier (e.g., a username) may be prepended to the content of a communicated message when sent through the proxy endpoint as shown in FIG. 4.

In some variations, the endpoint management system 130 can facilitate automatic selection of intermediary endpoints. Various rules that prioritize different factors such as endpoint-participant consistency, geographic proximity, account endpoint preferences, and/or other factors can be used in selecting intermediary endpoints. The endpoint management may additionally track endpoint usage and capacity and automatically allocate and/or deallocate endpoints from intermediary endpoint pools.

In some variations, the system may include a conversation state management system 140, which functions to manage the status state of a conversation within a communication channel. For some forms of communications in some communication channels, a communication session and/or participant may have state. For example, business communications may be restricted in some communication channels. The status state may include an active state and an inactive state. During an active state, communications can preferably occur as expected. During an inactive state, the conversation may be closed until some event or action. For example, in some OTT channels, businesses communicating with a user may be limited to an active window of time, which may depend on the life of the conversation or activity of the participant. The conversation state management system 140 may monitor such state information within a communication channel. These changes in state may be communicated to other communication channels. Additionally, activity that occurs during periods of inactivity can be tracked so that the state of conversation can be appropriately updated if a particular conversation of a communication channel transitions back from inactive to active.

Method

Figure 5:
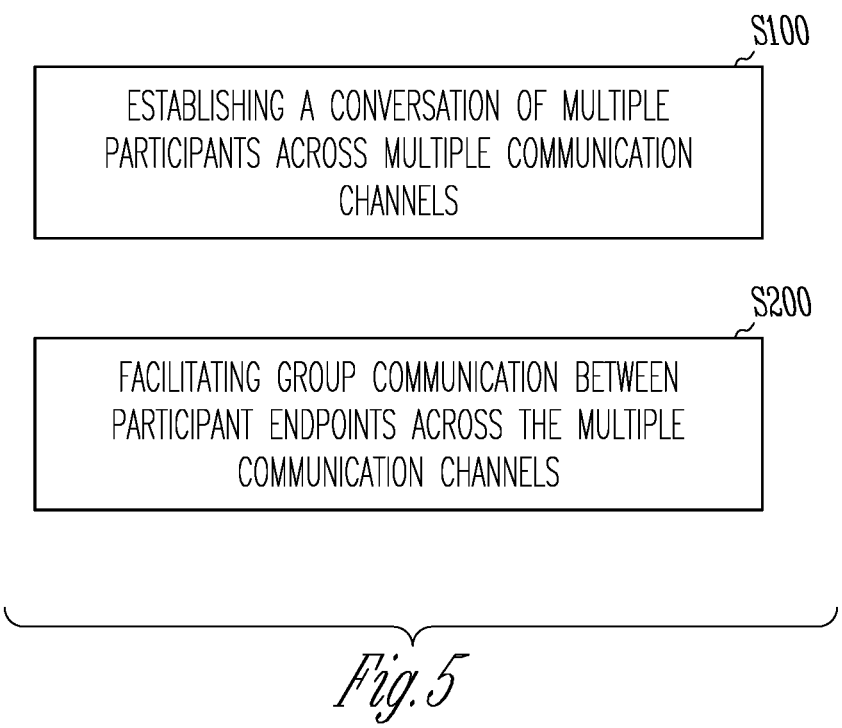
FIG. 5 is a flowchart representation of a method for multi-channel group communications.

As shown in FIG. 5, a method for multi-channel group communications of a preferred embodiment can include establishing a conversation of multiple participants across multiple communication channels S100 and facilitating group communication between participant endpoints across the multiple communication channels S200. The method functions to initialize and setup a conversation so that participants on different communication channels can participate. The initialization and setup may be done in response to an API request, a new incoming communication, or other suitable events. The facilitation of group communications may include relaying communications through appropriate intermediary endpoints configured and assigned in block S100.

The method is preferably implemented for asynchronous communication, which includes various forms of messaging or chat. The asynchronous communication can include the sending and receiving of various forms of media content such as text, images, videos, and/or audio. The communication may additionally include other forms of communication such as sending of stickers, reactions (e.g., likes, hearts, dislikes, etc.), interactive content, and/or other suitable forms of content. In some variations communications may signal other messaging information such as typing indicators, read or delivery receipts, and other interactive features. The method may in some variations additionally or alternatively be implemented for synchronous communication such as voice calls, video calls, screen sharing calls, and/or other real-time communication formats.

The method is preferably implemented by a system such as the one described above, but the method may alternatively be implemented by any suitable system.

In one variation, the method is implemented within a multitenant system wherein the method is implemented such that communication conversations can be implemented in association with various accounts. In other words, the method may include: for a first account, establishing a conversation of multiple participants across multiple communication channels and facilitating group communication between participant endpoints across the multiple communication channels; and for a second account establishing a conversation of multiple participants across multiple communication channels and facilitating group communication between participant endpoints across the multiple communication channels. This account-based processing may extend to the various variations and optional processes of the method. In some variations, various endpoints may be associated with different accounts, which may be referred to as account endpoints. The account endpoints may be used as participant endpoints and/or intermediary endpoints. In some variations, an account may have a pool of account endpoints—that is to say the account may have a set of account endpoints that are available for use in various ways. The intermediary endpoints, for example, may be selected from the pool of account endpoints and used for configuring and facilitating multi-channel group communications.

In another variation, the method may be implemented as a single tenant system. For example, the method may be implemented by a communication service which may operate have one main communication channel. The method can enable the main communication channel of the communication service to integrate and interact with other communication channels for group communications.

The method is described primarily as it is applied to a single communication conversation. However, the method is preferably implemented repeatedly by a communication system across multiple communication conversations. Accordingly, the method may be implemented such that it includes establishing a set of conversations, wherein each conversation is associated with multiple participants across multiple communication channels, and for each conversation of the set of conversations, facilitating group communication between participant endpoints of each conversation across the multiple communication channels.

In some variations, conversation configuration may be set as a default for multiple conversations. For example, within a multitenant implementation, an account may set default configuration for all communication conversations related to configuration for intermediary endpoints, media transformations, and/or other configurable aspects of a conversation.

Similarly, the method is implemented across multiple communications within a conversation. After a conversation is established, the method can preferably facilitate a plurality of communications originating from various participant endpoints.

The method is preferably implemented such that multi-channel group communications can occur for a plurality of participants greater than two. Those participants may be distributed across two or more different communication channels. While the method can be used for scenarios where there are three or more participants on two, three or more communication channels, the method can additionally serve communication conversations with fewer participants and fewer communication channels.

The method for multi-channel group communications in one variation applies the use of intermediary endpoints to facilitate bridging communications of a plurality of participants across multiple distinct communication channels. The method for employing endpoint management to enable multi-channel group communications may be implemented through an API enabling customization. The method for employing endpoint management to enable multi-channel group communications may additionally or alternatively be implemented automatically or semi-automatically wherein intermediary endpoints can be automatically selected and used to bridge participants of a multi-channel communications. The use of intermediary endpoints can be applied to support the wide variety of conversational topologies that can happen for various permutations of participants and communication channels (e.g., single participants on a channel, multiple participants on a channel, channels that support group communication, channels that don't support group communications, etc.).

Figure 6:
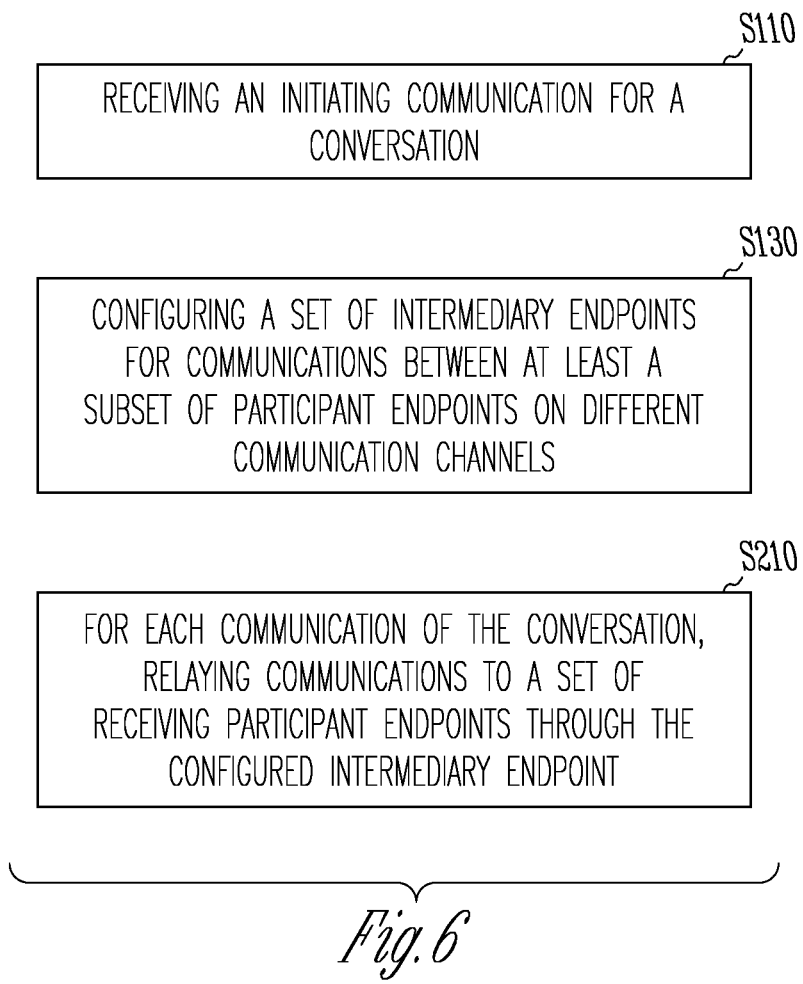
FIG. 6 is a flowchart representation of a method for using intermediary endpoints to facilitate bridging communications of a multi-channel group communication.

As shown in FIG. 6, a method for using intermediary endpoints to facilitate bridging communications of a multi-channel group communication can include receiving an initiating communication for a conversation S110; configuring a set of intermediary endpoints for communications between at least a subset of participant endpoints on different communication channels S130; for each communication of the conversation, relaying communications to a receiving set of participant endpoints through the configured intermediary endpoint S210. Relaying communications preferably includes transmitting communications to the receiving set of participant endpoints through the configured intermediary endpoint if configured for that communication channel. Similarly, relaying communications can include, in some instances, receiving communications through an intermediary endpoint and forwarding the communications appropriately to the other participants (possibly through additional intermediary endpoints depending on the communication channels).

The method for multi-channel group communications in another variation employs a programmatic interface for interactions with a multi-channel group communication. The use of a programmatic interface for multi-channel group communications can provide a convenient mechanism through which an entity can manage and/or monitor multi-channel group communications. This variation of the method may serve to provide a simple interface for developers to build and enable multi-channel group communications, while removing the complicated and non-trivial aspects of building a system capable of multi-channel group communications. Additionally, the variation of the method employing a programmatic interface can facilitate a central record of a conversation, which additionally abstracts away the complexities of setting up and reviewing a multi-channel communication conversation of a plurality of participants.

The implementation of a programmatic interface for interacting with a multi-channel group may be used in combination with the method for using intermediary endpoints to facilitated bridging communications of a multi-channel group communication. Alternatively, the method employing a programmatic interface may be implemented without the use of intermediary endpoints.

Figure 7:
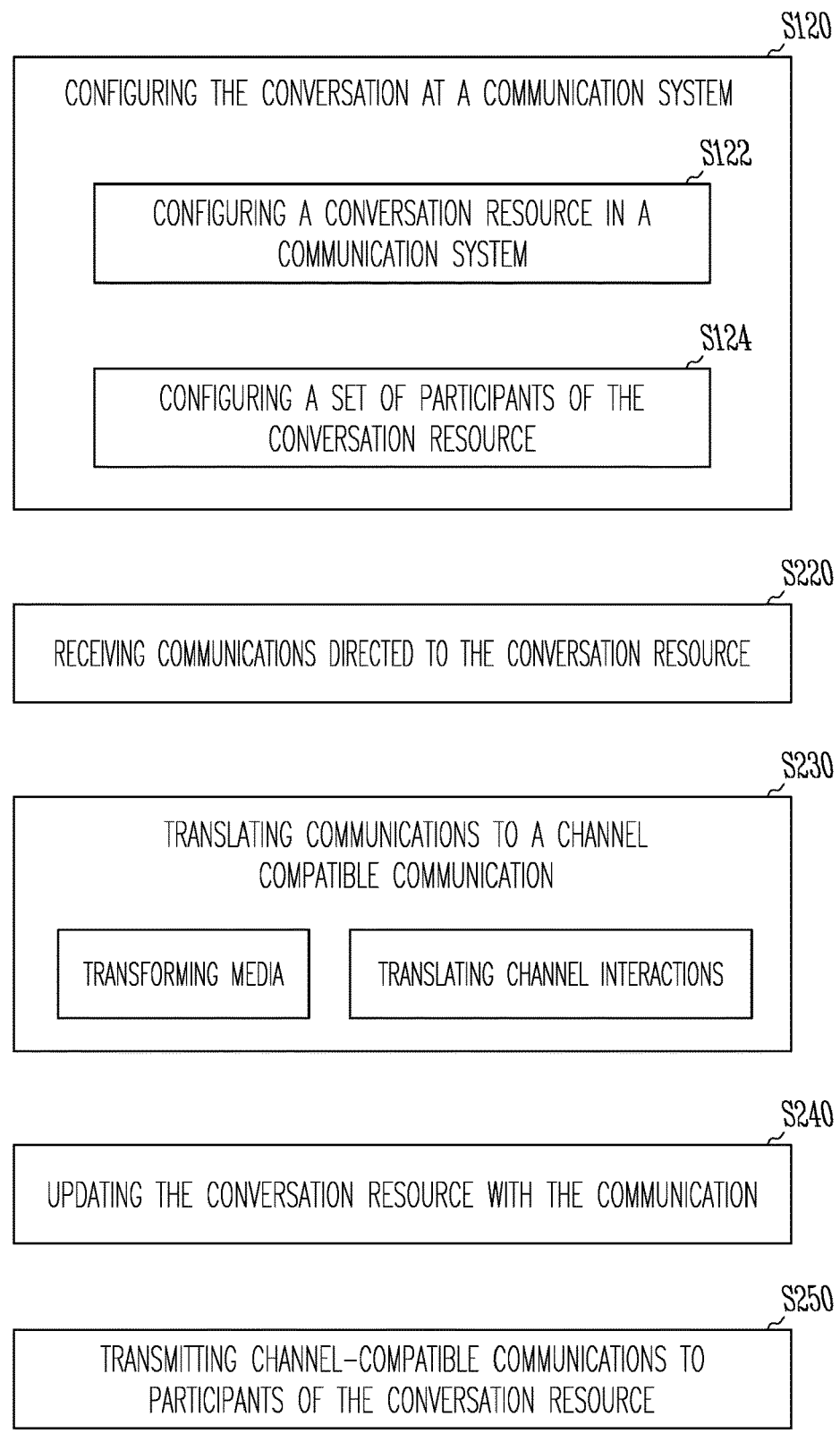
FIG. 7 is a flowchart representation of a method for employing a programmatic interface to multi-channel group communications.

As shown in FIG. 7, a method for employing a programmatic interface to multi-channel group communications of a preferred embodiment includes configuring the conversation at a communication system S120, which can include configuring a conversation resource in a communication system S122 and configuring a set of participants of the conversation resource S124; receiving communications directed to the conversation resource S220; translating communications to a channel compatible communication S230; updating the conversation resource with the communication S240; and transmitting channel-compatible communications to participants of the conversation resource S250. The method functions to facilitate group communications across multiple distinct communication channels.

Figure 8:
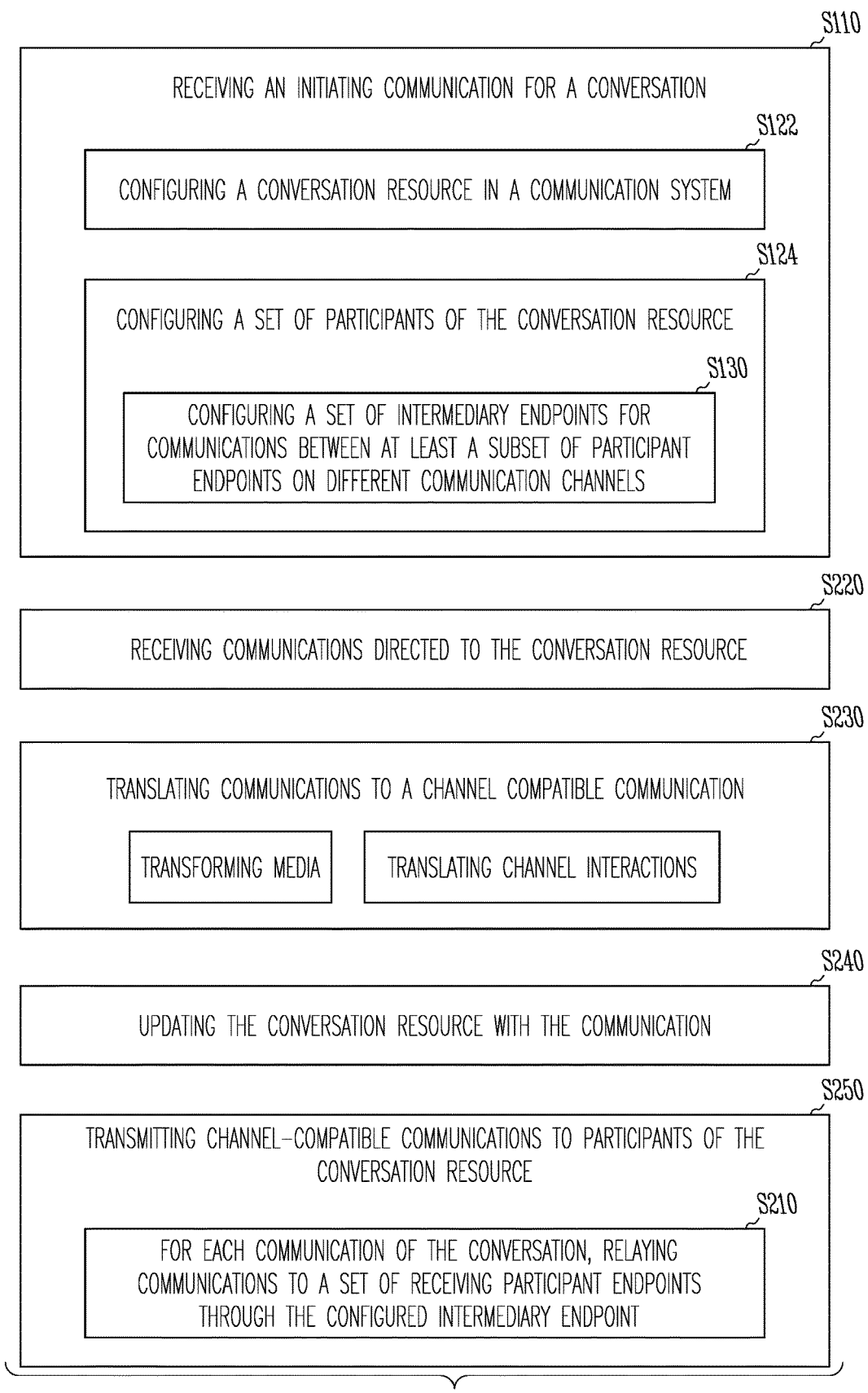
FIG. 8 is a flowchart representation of a method employing a programmatic interface and the use of intermediary endpoints for a multi-channel group communication.

As shown in FIG. 8, a variation of the method employing a programmatic interface and the use of intermediary endpoints for a multi-channel group communication can include: receiving an initiating communication for a conversation S110 through a programmatic interface comprising configuring a conversation resource in a communication system S122 and configuring a set of participants of the conversation resource S124, which includes configuring, a set of intermediary endpoints for communications between at least a subset of participant endpoints on different communication channels S130; receiving communications directed to the conversation resource S220; translating communications to a channel compatible communication S230; updating the conversation resource with the communication S240; and transmitting channel-compatible communications to participants of the conversation resource S250, wherein the channel-compatible communications are transmitted through the configured intermediary endpoints S210.

Block S100, which includes establishing a conversation of multiple participants across multiple communication channels, functions to initiate or setup a conversation. As will be described in the subprocesses below, establishing a conversation may be responsive to requests or events received through a programmatic interface. Additionally or alternatively, for some conversations, establishing a conversation may be responsive to received communications through a communication channel.

A conversation, sometimes referred to as a "thread", preferably characterizes a set of communications that may be organized sequentially in time. A conversation will preferably have a set of participants. In some variations, the participants may be static for a given conversation. For example, the set of participants may be fixed for the duration of the conversation once the first communication is sent. In other variations, participants may be added and/or removed at any point during the life of a conversation. A participant will preferably engage with the conversation using a client application using one communication channel. In some variations, the system and method may additionally enable a participant to have multiple client applications and possibly multiple communication channels through which they engage with the conversation. This may function to allow a participant to seamlessly switch between client applications and their participation is automatically consolidated for other participants.

Establishing a conversation of multiple participants can preferably support a count of participants three or greater though in some instances two participants can also be supported. More specifically, establishing a conversation of multiple participants establishes a conversation between a set of participant endpoints (e.g., an participant endpoint associated with a participant that maps to preferably at least one client device of a participant). The set of participant endpoints preferably includes participant endpoints from at least two distinct communication channels. That is to say, a first subset of the set of participant endpoints are on a first communication channel and at least a second subset of the set of participant endpoints are on a second communication channel. The first communication channel and the second communication channel are distinct and different communication channels in this description. Herein, stating that a participant endpoint is on a communication channel characterizes the property of participant endpoint where that communication channel is used to communicate with the participant endpoint, and furthermore the participant endpoint is an endpoint address of that particular communication channel. The subsets of participant endpoints may include a single participant endpoint or a plurality of participant endpoints.

The set of communication channels of the participant endpoints of a conversation can preferably include two or more distinct communication channels. The communication channels may be selected from the set of communication channels including a short message service (SMS) communication channel, multimedia messaging service (MMS) communication channel, an internet protocol (IP) messaging channel, and a third-party communication channel accessed through an application programming interface (API). Third-party communication channels can include OTT communication channels such as social network communication channels, app-based text or media communication channels, private corporate communication channels, and the like. In some instances, one of the communication channels may be an internal communication channel that is operated and/or at least partially controlled by the system implementing the method. An internal communication channel may have special capabilities that can be handled distinctly from other "external" communication channels. For example, intermediary endpoints may be simplified in that endpoints may be created on-demand or handled in alternative way to that of external communication channels.

Establishing a conversation of multiple participants across multiple communication channels preferably includes receiving an initiating communication for the conversation S110.

Block S110, which includes receiving an initiating communication for a conversation, functions to obtain or detect some message or event that signals a request or need to begin a conversation. Receiving an initiating communication for the conversations preferably results in triggering establishment of a conversation associated with a set of participant endpoints. As mentioned above, the set of participant endpoints can include participant endpoints from at least two distinct communication channels.

The received initiating communication may be a message received through one of the communication channels, but the initiating communication may additionally or alternatively be received from a programmatic interface or some other source. In some implementations, the method can support receiving an initiating communication to establish a conversation from various sources, and the source of the initiating communication will vary depending on the conversation.

In one variation, receiving an initiating communication for a conversation can include receiving an initiating communication through a programmatic interface. The programmatic interface is preferably an API, but may alternatively be any suitable type of interface through which programmatic requests can be issued by various computer systems. Receiving the initiating communication through a programmatic interface can include configuring a conversation resource in a communication system S122 and configuring a set of participants of the conversation resource S124. Blocks S122 and S124 can be used to setup various addressable API resources such as a conversation resources, participant resources, endpoint resources, and/or other addressable resources. These API resources can be created, properties and fields configured, and associations established such that a conversation is configured as desired by the requesting entity. In a multitenant implementation of the method, the requests may be made in association with an account, and the requests may be authenticated as being made by the account. Blocks S122 and S124 are described in more detail below.

Receiving the initiating communication through a programmatic interface can include receiving a conversation creation API request, wherein the API request or requests is the initiating communication. The participants may be configured through the API request when creating the conversation resource. Alternatively, some or all participants may be configured subsequent to the creation of the conversation resource. For example, a conversation resource may be created through one or a series of API requests, and then subsequent to creating the conversation resource, one or more participant resources may be created and associated and/or added to the conversation resource.

In one variation, receiving the initiating communication through a programmatic interface, may include receiving conversation creation API request and creating a conversation resource; and then receiving an inbound communication message and assigning the communication to the existing conversation resource. This variation may be used for redirecting communications to an established conversation.

In another variation, receiving an initiating communication for a conversation can include receiving an inbound communication from a communication channel and, in response, establishing the conversation. Establishing the conversation may include creating a conversation resource for a programmatic interface control. In this variation, new communications are used to automatically trigger creation of an associated conversation resource. The participants may be based on the inbound communication. The participants and their associated participant endpoints of the conversation may be set based on the specified destinations of the received inbound communication. For example, an inbound communication originating from endpoint A directed to endpoints, B, C, and D may initiate a conversation with participant endpoints associated with endpoints B, C, and D. Additionally, the origin of the inbound communication will preferably be included as one of the participant endpoints of the conversation. In the example above, the endpoint A may be included in the set of participant endpoints. In some instances, the endpoints specified may not include participant endpoint used as the actual participant endpoint address of the client device of the participant. In some instances the specified endpoints may be a configured intermediary endpoint previously associated with one or more participant endpoints.

In some instances, a conversation may need to be initiated with the participants to establish the group conversation for the participants in their respective communication channels. Initiating communication of a conversation resource may include programmatically prompting an initial communication to participants of the conversation resource. The initial communication functions to establish the group conversation in each participant's respective communication channel of choice. Native group conversations are preferably established in each communication channel through group communication features of that communication channel. In some situations, each participant is each individually represented by an intermediary endpoint so that there is a one-to-one correspondence for addresses (e.g., usernames, identifiers) and participants. Some scenarios however may have participants share a proxy intermediary endpoint such as when communicating with participant endpoints on a communication channel lacking support for group communications beyond two participants. In some other cases, multiple participants may share a proxy intermediary endpoint, and content of their communications can be automatically labeled or annotated to indicate the participant responsible for communications from that endpoint.

Initiating communication of a conversation resource may alternatively be performed by receiving an initial inbound communication specifying a set of participant endpoints. In this variation, the initial inbound communication is received through a communication channel. The pairing of participant endpoints and the originating endpoint may already be configured for a conversation resource whereby this can be used as the initial communication. For example, a conversation resource can be configured in anticipation of a group conversation. No communications are sent until one is sent from one of the participant endpoints. This communication can be detected, mapped to a corresponding group conversation and the configured multi-channel group conversation can be initiated with the other configured participants. In some instance variations, the initiating communication may not fully specify all the participants of the conversation, but once associated with the configured conversation resource the other participant endpoints can be automatically incorporated into the conversation. In other scenarios, a new conversation resource can be created for that inbound communication. For example, an account may be configured with a callback URI wherein an application server specified through the callback URI may receive a request when an inbound communication is received so that the application server of the account holder may appropriately create a conversation according to their own logic. The sending or receiving of an initial communication may be processed substantially similar to block S200 and its various subprocesses such as S210, S220, S230, S240, and/or S250.

Block S120, which includes configuring the conversation at a communication system, functions to set various operating conditions of a conversation. Configuring the conversation, in one variation, is performed prior to the transmission of communication message within the conversation. As discussed in the variations for initiating communication, some variations may have the conversation configured in response to a received inbound communication from one of the communication channels.

In one preferred embodiment, configuring the conversation at a communication system can include configuring a conversation resource in a communication system S122 and configuring a set of participants of the conversation resource S124. Configuring the conversation resource and the set of participants of the conversation resource is preferably performed through an API. In some variations, however, configuring the conversation resource and the set of participants of the conversation resource may be performed in alternative ways such as through a graphical user interface (e.g., an account dashboard of a communication system).

Block S122, which includes configuring a conversation resource in a communication system, functions to initialize a digital construct used in managing a session of communications. In one preferred implementation, the use of a conversation resource around which a conversation is organized can serve as a simplified approach to managing a multi-channel group conversation. This can simplify the programming model for sending messages and/or reading messages on a multi-channel conversation. In a preferred implementation, new communications are added to a session as opposed to being addressed to the participants. For new communications added to a session, all the participants will be copied the communication on their respective channels. Responses or messages received from one of the communication channels preferably result in the message being added to the conversation resource.

Configuring a conversation resource may include configuring a set of conversation properties and options. For example, the name of the conversation, participants, and/or other attributes can be set. Properties may be configured during initialization of the conversation resource but may additionally or alternatively be updated after creation of the conversation resource.

As another property variation, configuring a conversation may include configuring status property. The status is preferably set to active when communications may be transmitted. The status in some variations may be set to complete when a conversation is concluded, which preferably ends future communications. In some variations, automatic responses can be submitted to incoming communications to a completed conversation. Another alternative or additional status could be inactive, which may be used prior to starting the conversation or when pausing activity of a conversation.

As another property variation, configuring a conversation may include configuring media rules. As discussed below various media rules may be set that specify how media is processed prior to distribution to other participants and/or communication channels.

As another property variation, configuring a conversation may include configuring communication processing instructions. This, in one implementation, may be configured by specifying a URI (e.g., a "webhook"), which is used to address another resource capable of supplying processing instructions, or performing processing. Communication processing instructions may be used to mutate communications occurring within a conversation. For example, communication processing instructions may be specified that analyzes content of communications and removes content that violates a specified policy.

Configuring a conversation resource can additionally include exposing the conversation resource as an accessible API resource within a communication system the conversation resource. The conversation resource can be an API resource addressable by a URI or through some other reference or identifier. In one implementation, creating a conversation resource may be performed by sending an HTTPS POST message to a conversation resource URI. The POST message may include several properties that can be set for the created conversation. In response, the result of the POST request can be returned which may include indication of an identifier for the conversation resource instance created for the new conversation. Information on a particular conversation may be obtained through a HTTPS GET message sent to the conversation resource URI for the particular conversation resource instance. Configuration of a particular conversation may be updated through a HTTPS PUT, PATCH, POST, or other type of message sent to the conversation resource URI for the particular conversation resource instance. Alternative, APIs or programmatic interfaces may have other suitable implementations.

Configuring a conversation resource in a communication system may be performed in combination with configuring a set of participants. Alternatively, a conversation resource may be created and then the configuration of participants through process S124 performed subsequent to creation of the conversation resource. In yet another variation, one or more participants may be configured and specified for a previously uninitialized conversation resource, and, in response, a conversation resource can be automatically configured.

Configuring a conversation resource preferably includes receiving an API request specifying creation of a conversation resource. However, a conversation resource may alternatively be automatically configured and created in response to an inbound communication, participant configuration, and/or any suitable event.

A conversation (and its corresponding conversation resource) may be identified in a variety of approaches. In one variation, a conversation may be identified based on the set of participants. In participant-based identification, a given set of participants will have activity linked back to one conversation resource. The method may support querying for a conversation given set of participants. All messages and communications between participants will generally be managed under the conversation resource assigned for that particular set of participants.

In another variation, conversations may alternatively be assigned a unique identifier that can be referenced when taking programmatic action on the conversation and/or participants of the conversation. The unique identifier could be a thread or conversation name/label. The unique identifier may alternatively be an alphanumeric identifier (e.g., a security identifier).

A set of database tables may store conversation-identifying properties, which can be used for tasks such as mapping between participants, group addresses, conversations, and/or account records. In one exemplary implementation, properties stored can include an account identifier, a conversation identifier, a list of group MMS participants (or other suitable communication channel participants), a chat service identifier for the conversation, a group conversation type, status of group conversation (e.g., "initialized"—resource created but no messages have been sent and participants can still be added; "active"—messaging has started for conversation; etc.), managed endpoint, and/or participants. The list of group MMS participants is preferably sorted and normalized. The list of group MMS participants field (represented as a comma separated string or other suitable format) may be used as an index into a conversation group addresses. The list of group MMS participants can allow for efficient lookup of a conversation record from a group MMS by querying for the conversation using the formatted "group MMS participant" field. This field may additionally be used in efficiently relaying messages to group MMS participants during messaging. Another table of conversation group mappings may be indexed by a tuple of an account identifier and a conversation. The managed endpoint may be the internally managed of the communication platform that is selected for use when de-duplicating incoming messages in the case that there are multiple managed endpoints in a single group conversation. The participants property can contain participant addresses and associated participant endpoint types.

Block S124, which includes configuring a set of participants of the conversation resource, functions to set up a plurality of participants that will engage in a conversation. Configuring the set of participants preferably includes receiving an API request specifying a plurality of participants to add to a conversation resource. As mentioned above, all or a subset of the participants may be specified in a request or communication used in creating the conversation resource. Preferably, each participant is configured as an API resource, wherein actions such as creating, reading, updating, and/or deleting can be performed through API requests by the managing account or other authorized accounts. Configuring the set of participants may include one or more participant resources. In this variation, participants may, similarly to the conversation resource, be an addressable API resource to which various actions can be performed. These participant resources can then be linked or otherwise associated with a conversation resource to configure the set of participants of a conversation.

Configuring a participant resource will preferably include binding one or more endpoints to the participant which functions to configure an endpoint of a communication channel. Each participant will preferably include at least one client endpoint, which is used as an endpoint accessible by the participant to send communications, receive communications, and/or otherwise interact in the conversation (i.e., the participant endpoint). For example, the phone number of the participant's phone can be used as the client endpoint when connecting over SMS/MMS. In some variations, multiple client endpoints may be configured for a participant.

Additionally, for some topologies of multi-channel group conversations, one or more endpoints may be intermediary endpoints which function to represent the participant in communication channels outside of the communication channel native to the client endpoint. In general, an intermediary endpoint is configured for a participant to facilitate communication with other participant endpoints on other communication channels. In some variations, such as when a communication channel does not support group communication, intermediary endpoints may be used to enable group communications of participants within the same communication channel. Here, an external communication channel would be any communication channel that does not support giving the communication system control over the participant representation. External communication channels may include examples such as SMS/MMS and some third party OTT communication channels. A chat service operated by the communication system may allow for representation of participants in a flexible manner. Some external communication channels may also offer support API/protocol features to represent participants external to their system. For example, an IP chat service of the communication system could represent participants without the need of an explicit intermediary address and instead use a display endpoint where the participant is represented with a display endpoint, such as with a channel label and channel endpoint identifier. Other schemes may be used in setting the displayed label. Use of a display endpoint may alternatively include internally assigning an internal intermediary endpoint and mapping this internal intermediary endpoint to a display name, which is presented to the receiving participant. A display endpoint can be used when a communication channel is controlled by an operator of the method (e.g., when a first-party, internal communication channel) of which endpoint creation and use is controlled.

Various types of intermediary endpoints may be used such as projected endpoints, proxy endpoints, shared proxy endpoints, and/or display endpoints.

In one variation, the method may include specifying and verifying configuration of intermediary endpoints required for a particular conversation. The required intermediary endpoints may be determined based on the individual conditions of a conversation and may depend on the communication channels, the number of participants on each of the communication channels, and/or settings of the conversation. In some instances, the intermediary endpoints used for a conversation may be fully configured programmatically. Additionally or alternatively, configuring intermediary endpoints may include configuring settings for automatic or semi-automatic selection of intermediary endpoints. For example, how intermediary endpoints are selected (matching geographic properties like country code, area code, naming scheme, etc.), whether they are used persistently for the associated participant(s), where the endpoints are sourced (account pool of endpoints, shared pool, automatically purchased or acquired, etc.), and/or other properties can be set so that when intermediary endpoints are selected by the communication system they can be selected based in part on the configured settings.

In one variation, configuring a conversation resource may further include setting the messaging mode of the conversation which can be used to determine for the conversation, individual communication channels, individual participants how messages are routed using intermediary endpoints. For example, there could be a proxy mode wherein communication messages are routed through proxy endpoints, and there could be a projected mode where messages are communicated using projected endpoints of the participants. Determining how communications are routed could alternatively be automatically determined or applied based on the various conditions or properties of the conversation.

Figure 9B:
Figure 10:
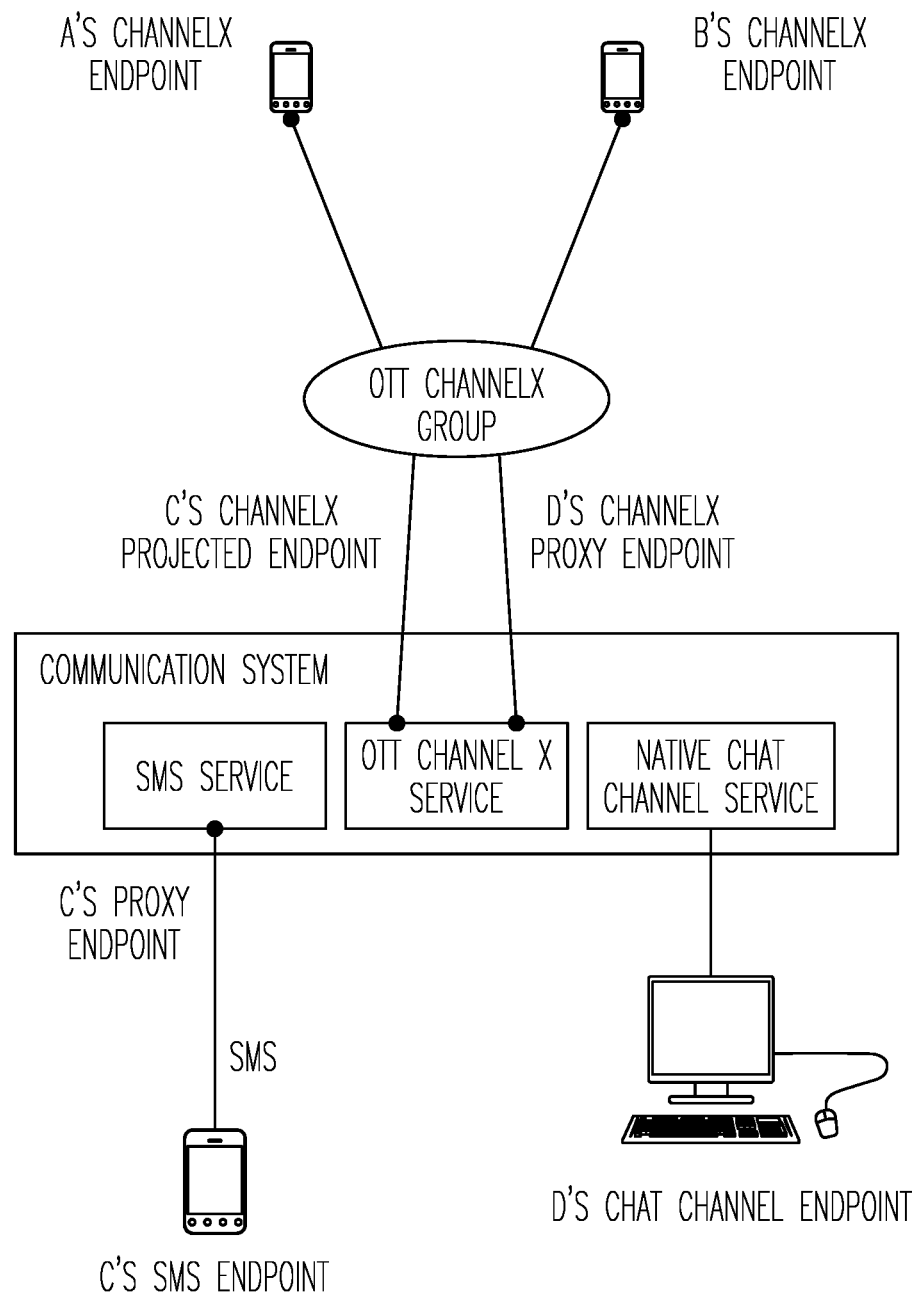
FIG. 10 is a schematic representation of an exemplary three-channel group conversation and its use of intermediary endpoints within different communication channels.

As shown in the exemplary API requests of FIG. 9A and FIG. 9B, a subset of participants may be configured with an intermediary endpoint so that the conversation can seamlessly work over the communication channels between the various parties. In cases where three or more communication channels are used, some participants may have multiple intermediary endpoints used in communications between it and other participants as shown in FIG. 10. Accordingly, configuring a set of participants of the conversation resource may include configuring a set of intermediary endpoints for communications between at least a subset of participant endpoints S130. Though, block S130 may be performed separate from or without configuration of conversation resources and/or participant resources using an API.

Configuring the conversation S120 and its various sup-steps of configuring the conversation resource S122 and configuring the set of participants of the conversation resource S124 may include regulating the creation of the conversation. Various restrictions, limits and/or other forms of policy may be enforced when configuring the conversation. Regulating creation can include verifying participant channel capabilities Regulating creation of the conversation may additionally or alternatively include verifying participant count. Different communication channels may have different participant limits. For example, one communication channel may have a group communication limit of 10 participants. The participant count limit may be communication channel specific. If the maximum number of participants is surpassed for a communication channel an error or warning may be issued during configuring the conversation S120.

Regulating creation of the conversation may additionally or alternatively include verifying addressability of the participants, which functions to confirm endpoint configuration for each participant is suitable for participation in the group conversation. This can include verifying the participant endpoint and/or the associated intermediary endpoints are appropriately configured and assigned so that each participant can participant. If a participant is determined to not be appropriately addressable in the group communication, that participant may be restricted from participating. This may result in an error or warning message during creation of the conversation.

Regulating creation may additionally or alternatively include verifying at least one managed participant, which functions to ensure that at least one participant endpoint routes communication through the communication system. A managed participant is preferably one with a participant endpoint or configured with an intermediary endpoint that is routed through the communication system. Preferably, the method supports conversations that include some participants with endpoints that are not managed by the communication system, but having at least one managed participant facilitates the communication platform interacting with the group communications. A managed participant could be one with a telephony phone number that is configured within the telephone network to be terminated at a computing resource of the communication system. A managed participant could alternatively be one with a third-party OTT account that has configured permissions for access by the communication system (e.g., to receive and/or send communications on behalf of the participant). A managed participant could alternatively be one with a chat endpoint that is similarly configured to route communications through the communication system. In addition to managing there is at least one managed participant, if there are multiple managed participants, the communication system may designate one of the endpoints for use in managing communications of the conversation, which may avoid duplication of communications.

Block S130, which includes configuring a set of intermediary endpoints for communications between at least a subset of participant endpoints on different communication channels, functions to setup the intermediary endpoints to facilitate group communication across channels based on the channel-participant topology for a given conversation. The configuring of intermediary endpoints preferably happens as part of the initialization of a conversation. The configuring of intermediary endpoints may additionally happen if the set of participants change such as when a new participant is added or when a participant is removed. Configuring the set of intermediary endpoints for communication between two particular communication channels can include configuring a set of intermediary endpoints for communicating between at least a first subset of the set of participant endpoints on a first communication channel and a second subset of the set of participants on a communication channel other than the first communication channel. The number and associations of the endpoint can depend on the communication channel, participants, and type of intermediary endpoint. In general, the intermediary endpoints are based on properties of the communication channels of the set of participant endpoints.

Depending on various factors the intermediary endpoints could include shared proxy endpoints and/or projected endpoints. In the case where an internal communication channel or other suitable communication channel is used, a display endpoint may be used in representing a participant. The different intermediary endpoints can be used to maintain participant representation across multiple communication channels. In the example shown in FIG. 10, four participants engage in a three-channel group conversation. Intermediary endpoint may not need to be used for participants A, B, and C when engaging with participant D since the native chat channel can manage representation of the participants appropriately using a form of display endpoint. If non-group SMS is used, then participant C may be assigned a proxy endpoint with which the participant endpoint of participant C engages for group communication with A, B, and D. In other words, the proxy endpoint used for participant C translates the group communication into a one-to-one communication supported by the non-group communication channel of participant C.

In one variation, configuring an intermediary endpoint may be specified in the instruction for establishing the participant. In other variations, binding one or more endpoints can include selecting an intermediary endpoint, which functions to automate selection and binding of an intermediary endpoint. In some variations, an intermediary endpoint may be automatically selected by the system. Intermediary endpoints may be selected from a pool of available endpoints. Intermediary endpoints may be selected based on geography. For example, country codes and area codes may be selected to be closer in proximity for telephony endpoints. Other suitable rules may be used in selecting an endpoint.

An intermediary endpoint may be used as an ephemeral mapping used only within the conversation resource. In the variation of an ephemeral mapping, configuring at least one intermediary endpoint includes temporarily associating the intermediary endpoint with a participant endpoint. The temporary association may be for any suitable duration. Preferably, the temporary association is for the duration of the conversation. In other variations, a selected intermediary endpoint may be permanent or semi-permanent, wherein configuring a set of participants may include, for one participant, pairing or associating a selected intermediary endpoint uniquely to participant pairings and/or groupings. The pairing or association can be persistent across multiple conversations or sessions with the same or different participants. The intermediary endpoint can be used repeatedly when the participant engages in conversations with that particular participant or alternatively with that particular group of participants. In this way, when a selected intermediary endpoint address of a participant is used when communicating, the intermediary endpoint can be consistently used to represent that participant for the other participants. In other variations, an intermediary endpoint is more permanently assigned to a participant and used as a type of "projected" endpoint address. An assigned projected endpoint may be used with that participant endpoint on multiple distinct conversations. The participant may be informed of such projected intermediary endpoint addresses so that the participant can share these proxy endpoint addresses as a way of contacting them.

In one variation, configuring the set of intermediary endpoints for communications can include assessing group communication capabilities of a communication channel and selecting a type of intermediary endpoint to configure based on the group communication capabilities for that communication channel. This variation of assessing capabilities functions to enable automatic or at least partially automatic setup of intermediary endpoints. The capabilities of an individual communication channel preferably determine the nature of configuration of intermediary endpoints for that channel. In some variations, the group communication capabilities may further depend on the number of participants outside of the communication channel, on the communication channel, and the properties of the other communication channel. In some cases, the assessment may further depend on properties of the participant endpoints. For example, a participant may have pre-configured settings for intermediary endpoints that can be used.

Assessing the group communication capabilities is preferably performed for each communication channel of the conversation. Assessing the group communication capabilities may include identifying group-supported communication channels (i.e., the communication channel supports group communications) and group-limited communication channels (i.e., does not support or is limited in group communications). Assessing may further identify communication channels supporting display endpoints or other participant representation options such as native participant representation in the channel.

In a conversation instance where a group-limited communication channel is detected, configuring the set of intermediary endpoints can include assigning a proxy intermediary endpoint if the communication channel does not support group communications. Furthermore, when transmitting communications to each participant endpoint, the communications are sent through the configured proxy endpoints for at least communications to the communication channel that does not support or is limited in group communications. More specifically, transmitting communications through the configured proxy endpoints may include transmitting communications originating from participants outside of the communication channel to a participant endpoint on the communication channel from the proxy intermediary endpoint. In this manner, a participant endpoint may communicate with a group but where all or a portion of the participants are communicated through a shared proxy endpoint. In some instance variations, content of a communication (e.g., the text, images, video, media, etc.) may be augmented and transformed. In some instances, a communication may be augmented by annotating communication content to identify the participant. The content of a communication is preferably annotated with an identifier of the originating participant (i.e., the sending participant). For example, a display name of the originating participant may be appended to or included in a message.

A communication channel may be characterized as not supporting group communications if it does not support group communications of participants in number greater than or equal to the number of participants of the conversation. In many cases, a group-limited communication channel will be limited to only one-to-one communication (e.g., a group of two participants). However, in some cases, a communication channel may support group communication to some threshold like five but the conversation may have greater than five participants resulting in the communication channel being group-limited for this particular conversation.

In some variations, one proxy endpoint may be used to communicate individually with distinct participant endpoints on the group-limited communication channel. Alternatively, different proxy endpoints may be used for each or subsets of the participant endpoints on the group-limited communication channel.

There may be multiple group-limited communication channels. Proxy endpoints can be configured individually for each of the communication channels using proxy endpoints suitable for the respective communication channels.

In a conversation instance with group-limited communication channels, the participants of the group-limited communication channels may be assigned projection endpoints for use in other group-enabled communication channels so as to represent those participants as full group participants.

In a conversation instance where a group-enabled communication channel is detected, configuring the set of intermediary endpoints can include: for a first communication channel that supports group communications, selecting a projected endpoint for each participant endpoint that is not on the first communication channel. Participants outside of the first communication channel can be assigned a projected endpoint that can be used to represent them in group communications with participant endpoints on that communication channel. In this way, each participant of the conversation can appear as a native participant in the first communication channel, and to the participants on that communication channel, all the participants will preferably appear to also be using that communication channel for communication. Though in some implementations, it may be indicated if and which participants are on different communication channels especially if and when some functionality is limited.

The projected endpoints (i.e., projected intermediary endpoints) are preferably endpoints of the first communication channel. Those may be obtained and used in various ways depending on the communication channel. In the case of telephony communication channels, projected endpoints can be selected from a pool of phone numbers. The pool of phone numbers may be a set preregistered by an account. Alternatively, the phone numbers may be automatically acquired and used. For example, phone numbers may be automatically selected and purchased and used as a projected endpoint. For other communication channels, selection and use of projected endpoints may depend on registering an endpoint to be used. Some communication channels may support ways of representing out-of-channel participants and those projected or façade participant endpoint representations may be used.

Furthermore, when transmitting communications to each participant endpoint, the communications are sent through the configured projected endpoints, which includes transmitting communications from an originating participant endpoint to participant endpoints on the first communication channel using the projected intermediary endpoint of the participant endpoint. Similarly, messages received at the projected endpoint are correspondingly relayed to the participant endpoints not on the first communication channel.

As the nature of configuring intermediary endpoints will generally depend on the topology of participants and communication channels for a given conversation instance, some instance variations may include configuring of proxy endpoints for communication with one communication channel and configuring projected endpoints for communication with a second communication channel. More specifically, configuring a set of intermediary endpoints may include: if a first communication channel supports group communication, selecting a projected endpoint for each participant not on the first communication channel and if a second communication channel does not support group communication, selecting a proxy endpoint to associate with at least one participant endpoint of the second communication channel. Relaying of communications between the first, second, and/or other communication channels will preferably be performed according to the type of configured intermediary endpoints as described above.

Block S200, which includes facilitating group communication between participant endpoints across multiple communication channels, functions to manage communication transmission between participants of a conversation. Facilitating group communication preferably includes relaying communications of the conversation appropriately to the participants. The communications are preferably messages comprised of content. The content can be text, images, video, audio, and/or other forms of media. The communications may be initially received from one of the participants, detected to be a communication that is part of the conversation, and the communication then relayed to other participants.

Relaying a received message can include transmitting the message to at least participant endpoints external to the originating communication channel. In some communication channels, the communication may be automatically relayed to participants also in the originating communication channel. Participants within the same communication channel preferably receive communications from those subsets of participants through native communication of that channel. When relaying communications across channels, the method preferably facilitates appropriately relaying messages such as to avoid communication duplicates and echoes.

In the method variation for using intermediary endpoints to facilitate bridging communications of a multi-channel group communication preferably includes, for each communication of the conversation, relaying communications to a receiving set of participant endpoints through the configured intermediary endpoints S210.

Block S210, which includes for each communication of the conversation, relaying communications to a receiving set of participant endpoints through the configured intermediary endpoint, functions to use intermediary endpoints to appropriately simulate multiple participants, if appropriate, on different communication channels when sending communications. That is to say, communications are transmitted through projected intermediary endpoints, proxy intermediary endpoint(s), or with a display endpoint based on the configuration of the conversation. The receiving set of participant endpoints are preferably participant endpoints that are not on the communication channel of the originating communication In some variations, some participant endpoints on the same communication channel of the originating participant endpoint may also be relayed the communication such as when a communication is initiated programmatically through an API request. In some instances, the receiving set of participant endpoints includes a single participant endpoint on a different communication channel. The receiving set of participant endpoints may include participant endpoints from one communication channel or multiple communication channels.

Relaying communications to the receiving set of participant endpoints through the configured intermediary endpoints is preferably performed so as to appropriately update each participant with communications from the other participants. This is preferably done so that for each message sent, each participant receives a corresponding message. Distribution of communications to participants of a first communication channel is generally only performed if the communication originates from a participant outside of the first communication channel. Additionally, to avoid message duplication when there are multiple managed endpoints of a channel (e.g., endpoints of the communication system that can receive and/or send communications), one managed endpoint may be used for monitoring incoming messages from the channel. Other alternative approaches may be used for deduplicating communications.

In the instance variation of relaying a communication to one or more participants on a group-limited communication channel, relaying communications can include transmitting communications originating from participants outside of the group-limited communication channel to a participant endpoint on the group-limited communication channel from the proxy intermediary endpoint. If multiple participants exist on the group-limited communication channel, this may include for each participant on the group limited communication channel transmitting the communication from a proxy endpoint. The proxy endpoint could be the same for all or a subset of the participant endpoints on the group-limited communication channel. The proxy endpoint may alternatively differ for each or at least a subset of the participant endpoints on the group-limited communication channel. The proxy endpoint is preferably maintained for each receiving participant endpoint such that the communications are kept in one conversation thread on the participant client device.

In one variation, transmitting the communications using a proxy endpoint may include annotating or otherwise augmenting content of a communication from a participant outside of the group-limited communication channel and transmitting the annotated content to the participant endpoint on the group-limited communication channel. This may be used to add identifiers of the origin of a communication to the content so that the receiving participant can observe which participant is sent the communication. These annotations may be made within one communication. For example appending the name of the sending participant before a text message. The annotations may additionally be sent as an independent communication preceding or proceeding a communication. For example, the name of the sending participant may be sent after sending an image from the sending participant.

In the instance variation of relaying a communication to one or more participants on a group-enabled communication channel, relaying communications can include transmitting communications originating from a participant endpoint external to the group-enabled communication to participant endpoints of the group-enabled communication channel using the projected intermediary endpoint of the participant endpoint. In other words, a projected endpoint associated with the participant from whom the communication originates can be used to send the communication to one or more participant endpoints on the communication channel of the projected endpoint. In the case where there are multiple group-enabled communication channels, a projected endpoint from each communication channel may be used for sending the communication to participants of its respective communication channel.

In the case of a controlled or internal communication channel, a display endpoint of that communication channel can be used as a form of projected endpoint. As the representation of the participants of a group communication session may have more flexibility and control, various approaches may be used to represent the participants of the conversation in such a communication channel.

In some variations, facilitating group communication between participant endpoints across multiple communication channels is implemented through a conversation-based API. In particular the API can make use of a conversation resource as the central model for managing the communications. In such a programmatic interface variation, facilitating group communication between participant endpoints across multiple communication channels can include receiving communications directed to the conversation resource S220; translating communications to a channel compatible communication S230; updating the conversation resource with the communication S240; and transmitting channel-compatible communications to participants of the conversation resource S250. As discussed above, this variation can be used in combination with relaying communications through intermediary endpoints.

Block S220, which includes receiving communications directed to the conversation resource, functions to obtain an incoming communication intended to be distributed to the group. A communication is preferably received through one or more interfaces with a communication channel. The communication will generally originate from a participant endpoint and be directed at participant endpoints of the conversation.

In one variation, communications may additionally be programmatically inserted into the communication wherein an API request may be made to add a communication to a conversation resource. An existing participant may be specified as the originator of the communication thereby sending a communication on behalf of a participant. In this variation, the specified originator of the communication may or may not have their client application updated to reflect the communication depending on capabilities of the communication channel.

Block S230, which includes translating communications to a channel compatible communication, functions to process communications prior to transmitting to participants of other communication channels. Communications are preferably performed to make the communications appropriate for different communication channels. Communication channels can have different capabilities, limitations, and general expectations. Translating of a communication can be specific to the origin-destination pairing of communication channels. In this way, a communication from a first communication channel may be translated three different ways for a conversation that is using four different communication channels.

Communication transformation can be performed selectively, wherein a channel compatible communication may be substantially unchanged in its content and information. In other words, the communication can be relayed without modification to a destination communication channel for a subset of communications and/or for some origin-destination pairings of communication channels.

Translating communications may include transforming media to a channel-compatible format. Media type, format, and/or other properties can be changed when transforming media. If the file type is an image and the file size is a limiting property, the file can be transformed (resized, encoding/compression change) to a channel-compatible format. In some cases, the message format of the media can be altered. Some communication channels may support media formats for displaying groups of media files in a carousel where others may not. Media may be appropriately translated between these different formats.

In the event where transforming media to a channel-compatible format cannot be performed or is restricted in some way (e.g., media type is not supported for a particular communication channel), then the media may be transformed to a network hosted media file and referenced by a URL/URI.

In connection with media, processing media may include setting media configuration of the conversation resource and applying the media configuration. The media configuration may define rules for transforming media (e.g., setting maximum file size). The media configuration specifies rules for blocking media matching a restricted media condition. The restricted media conditions may be used to block media based on type, size, content, and/or other suitable properties.

Translating communications to a channel compatible communication may additionally include mapping interaction state of a source channel of a communication to a destination channel of a participant. Mapping of interaction state is preferably used in translating supplementary interactions and features of communication channels. Such interaction states can include typing indicators, delivery and read receipts, communication reactions (e.g., likes, up-votes, responses, comments). These interaction features may have parallel interaction features in other communication channels, in which case they can be appropriately translated to their closest approximation. In other cases, there may be no direct way of communicating such interactions, in which case alternative ways of representing the interactions may be used. Alternatively, interaction features may not be communicated to the non-supporting communication channels.

In one related example, different channels may have different types of communication receipts. One communication channel may only have delivery receipts while another will have delivery and read receipts. An interaction mapping can define how delivery and read receipts or one channel are translated to the channel with just delivery receipts. When such interactions features are detected, they may be relayed in an appropriate form to the other communication channel.

In some variations, the method may additionally include mutating communications prior to relaying the communication, which functions to process and/or change content of the communication. The communication system preferably acts as a proxy for communications between communication channels and as such the communication system can be used in processing communications in-flight to other communication channels.

In some use-cases, this is used to mutate or change the content of a communication. For example, a business may have communications made by agents processed for any non-permitted information. The business may additionally process communications by customers before routing to their agents so that some personal information can be redacted to mitigate risk or liability.

In one variation, mutating communications involves retrieving processing instructions and processing the processing instructions for the communication. The processing may output a mutated communication message. The processing instructions may be preloaded and configured in connection with the conversation resource. In one variation, the processing instructions are provided dynamically by an application server. Accordingly, one implementation can include requesting processing instructions from an application server where the request includes communication properties (e.g., message content, timestamp, originating participant, conversation properties, etc.) and receiving the processing instructions from the application server. The application server can be an external application server such as a server hosted and operated by the account manager. The application server could alternatively be an application server. The application server will preferably generate or supply processing instructions based on any suitable business logic, which may be based on the communication properties and/or other data.

Block S240, which includes updating the conversation resource with the communication, functions to update the conversation resource such that it represents the state of communications. In one implementation, the conversation resource may store a log of all original communications and the corresponding communications transmitted to other communication channels. The log of corresponding communications may represent any transformations applied to the communication either for making it channel-compatible or based on other in-flight changes. Along with updating the conversation resource with the communication, the state of individual communications may additionally be stored and updated. In particular, the conversation resource or another resource associated with the conversation may store a record of read and/or delivery receipts such that by querying the resource one can inspect which participants received any given communication and/or which participants read any given communication. Similarly, a record of communication versions (e.g., altered communications) for a given participant or communication channel may be logged. Other suitable properties or history information may be recorded in association with a conversation. It can preferably be inspected through a programmatic interface (e.g., API), a user interface, or any suitable interface.

Block S250, which includes transmitting channel-compatible communications to participants of the conversation resource, functions to relay a processed communication to participants of other communication channels. A channel-compatible communication is preferably transmitted for each communication channel. The communication may additionally have been mutated in-flight as discussed above. As one note, the communication will generally not be transmitted to participants communicating on the same communication channel as the original communication as that communication channel will have facilitated distribution of that communication. Though in some communication channel variations, the communication may also be relayed to other participants on the communication channel. In the variation where an intermediary endpoint is used in relaying communications to a set of participants of the conversation, transformation of the content preferably happens prior to transmitting from the intermediary endpoint. More specifically, transmitting a channel-compatible communication through intermediary endpoints may include or be implemented for a given communication by: initially translating the at least one communication to a channel compatible communication for at least a first communication channel and transmitting the channel-compatible participant endpoints of the first communication channel through a configured intermediary endpoint for the first communication channel.

Block S220, S230, S240, and S250 are preferably performed repeatedly over multiple communications occurring in the conversation. As a result, the method can manage a multi-channel group communication session where in effect multiple group communication sessions are maintained and synchronized for each sub-group of participants using a particular communication channel.

The method can preferably be implemented for facilitating multi-channel group communication for a variety of participant-channel topologies with varying number and type of communication channels and varying numbers of participants on the communication channels.

Figure 11:
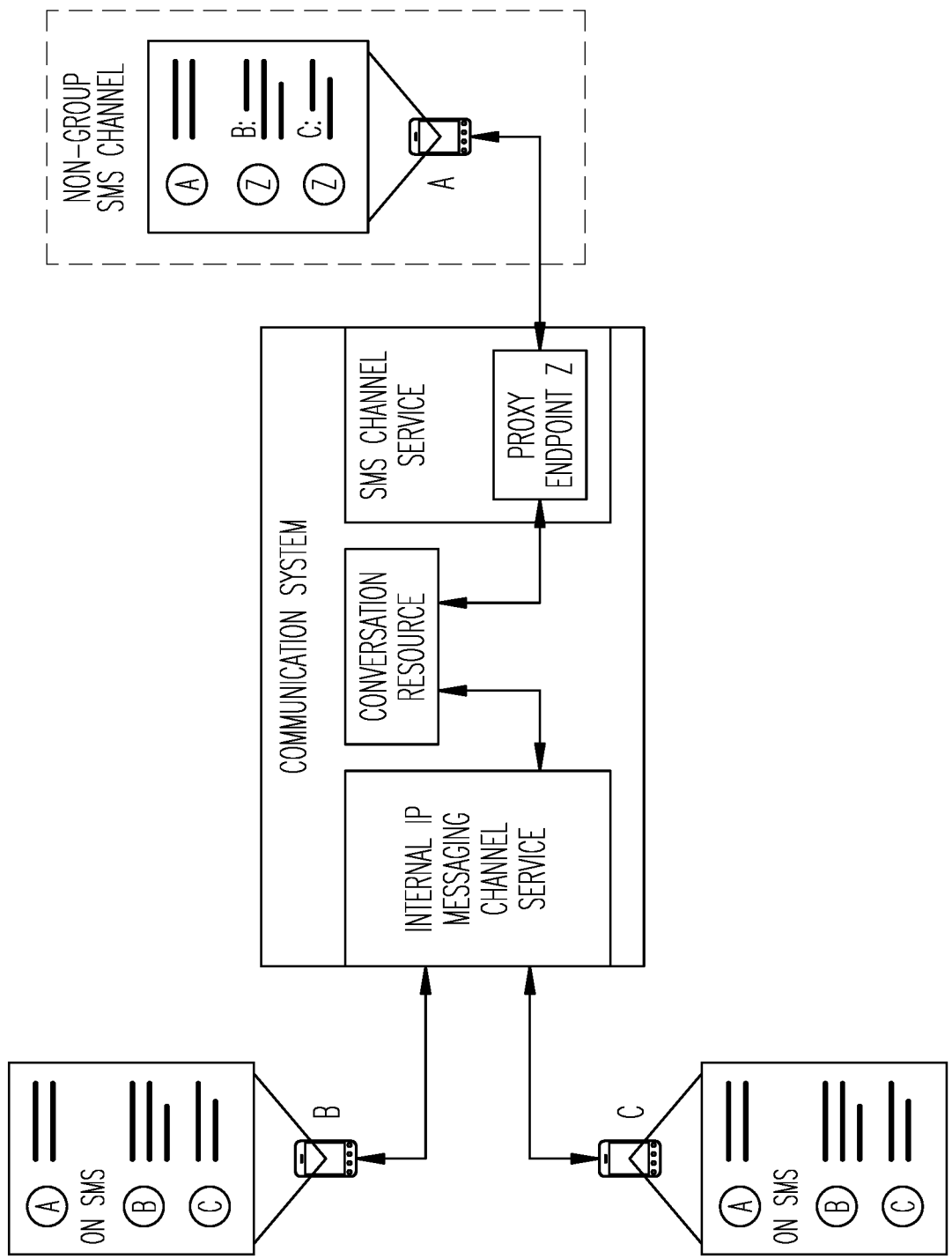
FIG. 11 and FIG. 12 are diagram representations of communication orchestrations for exemplary conversation instances involving a group-limited communication channel and an internal IP messaging/chat communication service.

As shown in FIG. 11, one exemplary instance involving a group-limited communication channel and an internal IP messaging/chat communication service may enable two participants B and C using an IP messaging application to participate in a three-way messaging session with participant A that is on an SMS communication channel that does not support group chats. In this exemplary instance, a display endpoint representation is used for representing participant A within the clients of B and C, and a proxy endpoint is used to represent the group communications of B and C to A. Annotations may be added to communications sent from the proxy endpoint Z to identify the originator of the communication.

Figure 12:
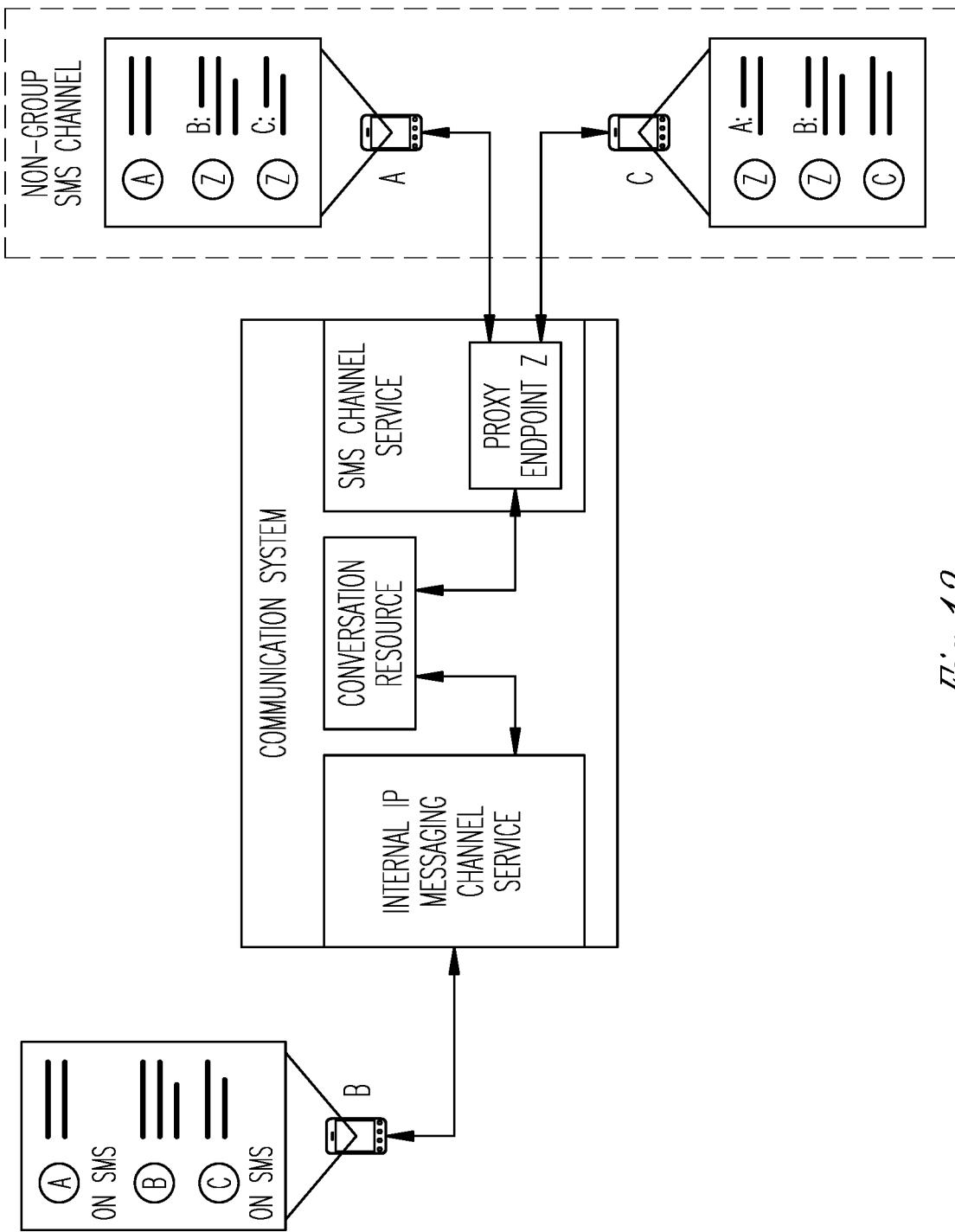

As shown in FIG. 12, a similar exemplary instance involving a group-limited communication channel and an internal IP messaging/chat communication can configure and transmit communications using intermediary endpoints such that participant A, B, and C can communicate despite A and C being on a communication channel that does not support group communication. As in the example of FIG. 11, a proxy endpoint Z can be used to represent the group communication to each of A and C. However, in this instance shown in FIG. 12, messages from B and C are sent through proxy endpoint Z to A, and messages from B and A are sent through proxy endpoint Z to C. In this exemplary instance, display endpoint representations may be used for representing participants A and C within the client of B. As another variation not shown, two different Proxy endpoints may be used where one proxy endpoint is used for A and a different proxy endpoint is used with C.

Figure 13:
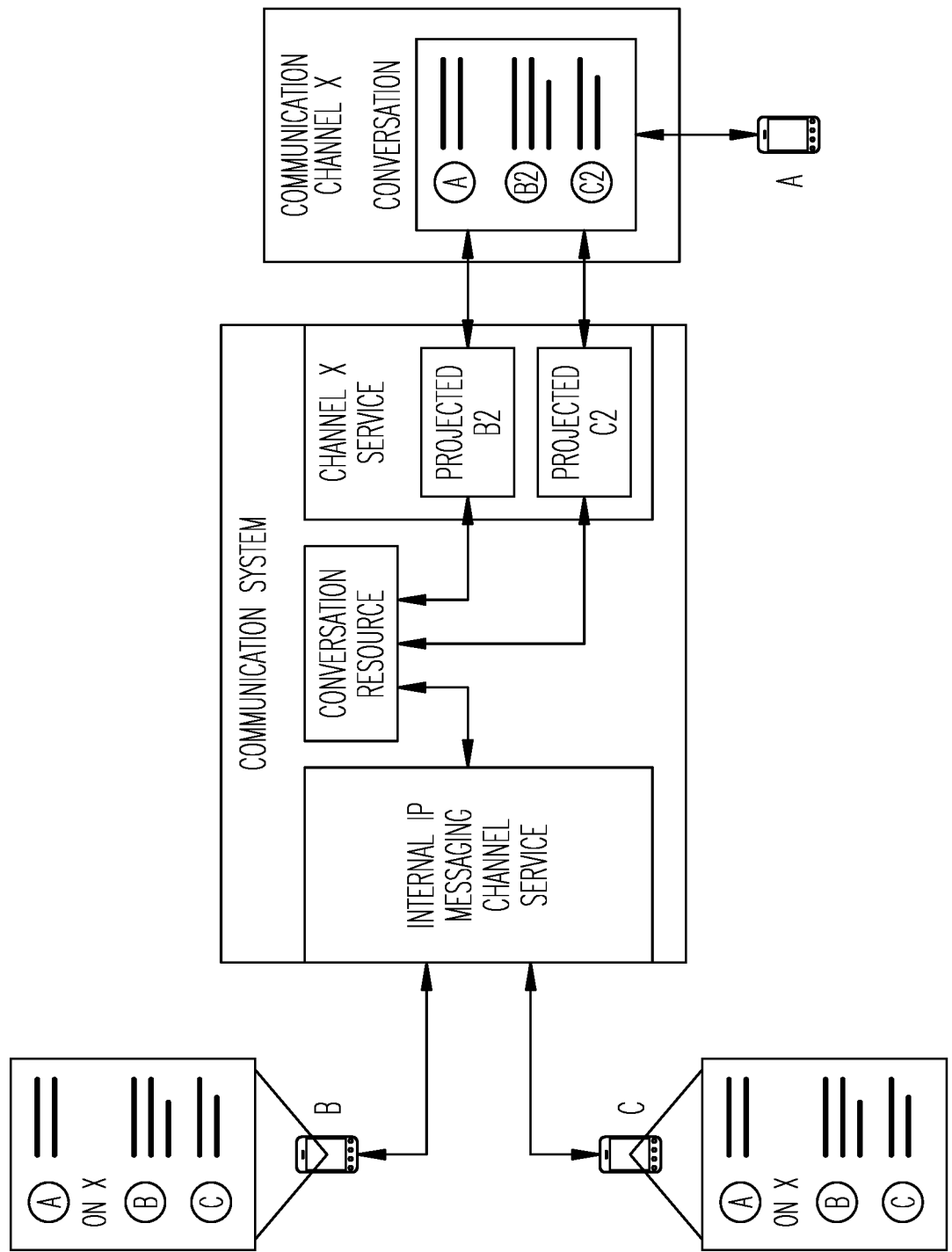
FIG. 13 and FIG. 14 are diagram representations of communication orchestrations for exemplary conversation instances involving group-enabled communication channels.

As shown in FIG. 13, one exemplary instance involving group-enabled communication channel and an internal IP messaging/chat communication service may make use of projected endpoints for enabling participants B and C of the IP messaging/chat communication channel communicate with participant A on communication channel X. As shown, B may be assigned a projected endpoint B2 for communication on channel X, and C may be assigned a projected endpoint C2 for communication on channel X.

Figure 14:
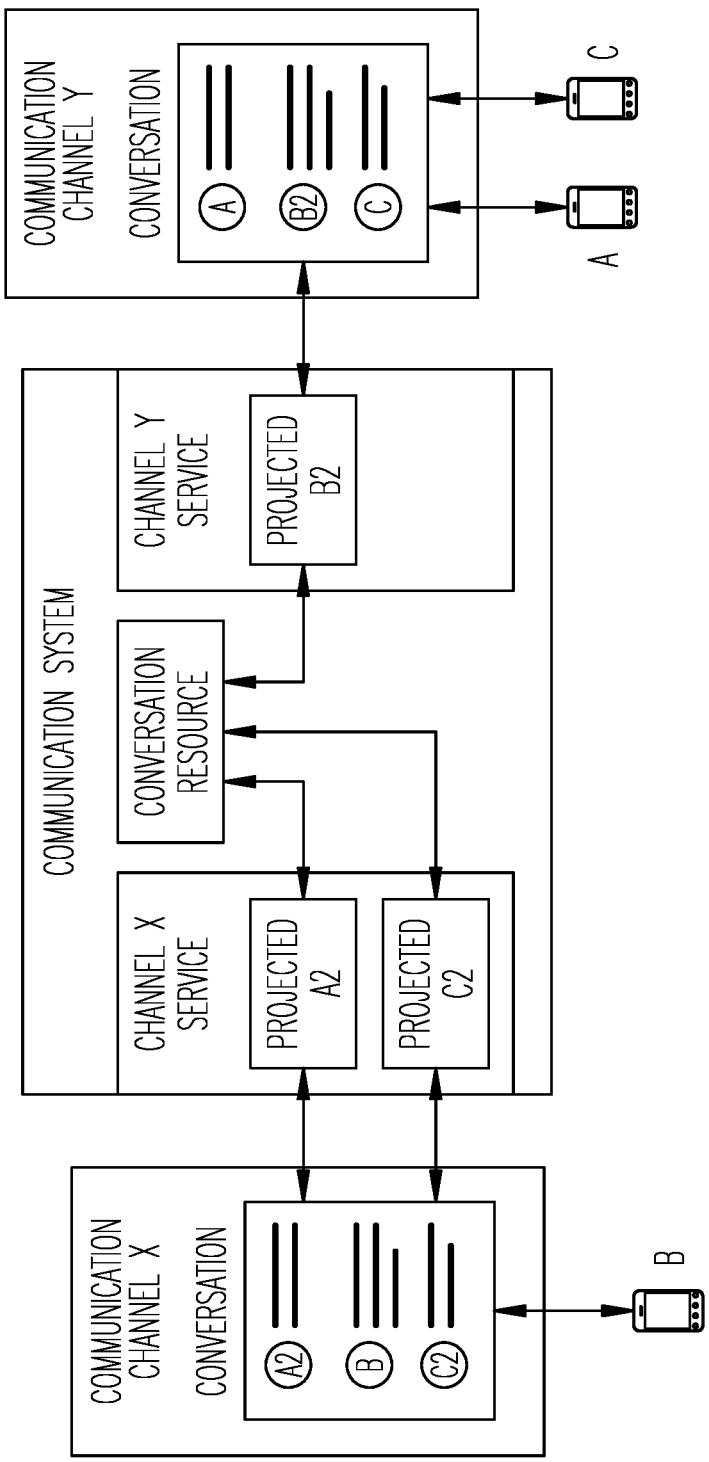

As shown in FIG. 14, communicating with group-enabled communication channels is not limited to a single group-enabled communication channel. In the exemplary instance shown in FIG. 14, a conversation involves two group-enabled communication channels. As shown, projected endpoints may be appropriately configured for endpoints for other communication channels. Participant endpoints A and C on channel Y are configured with projected endpoints A2 and C2 on channel X, and participant endpoint B on channel X is configured with a projected endpoint of B2 on channel Y.

Figure 15:
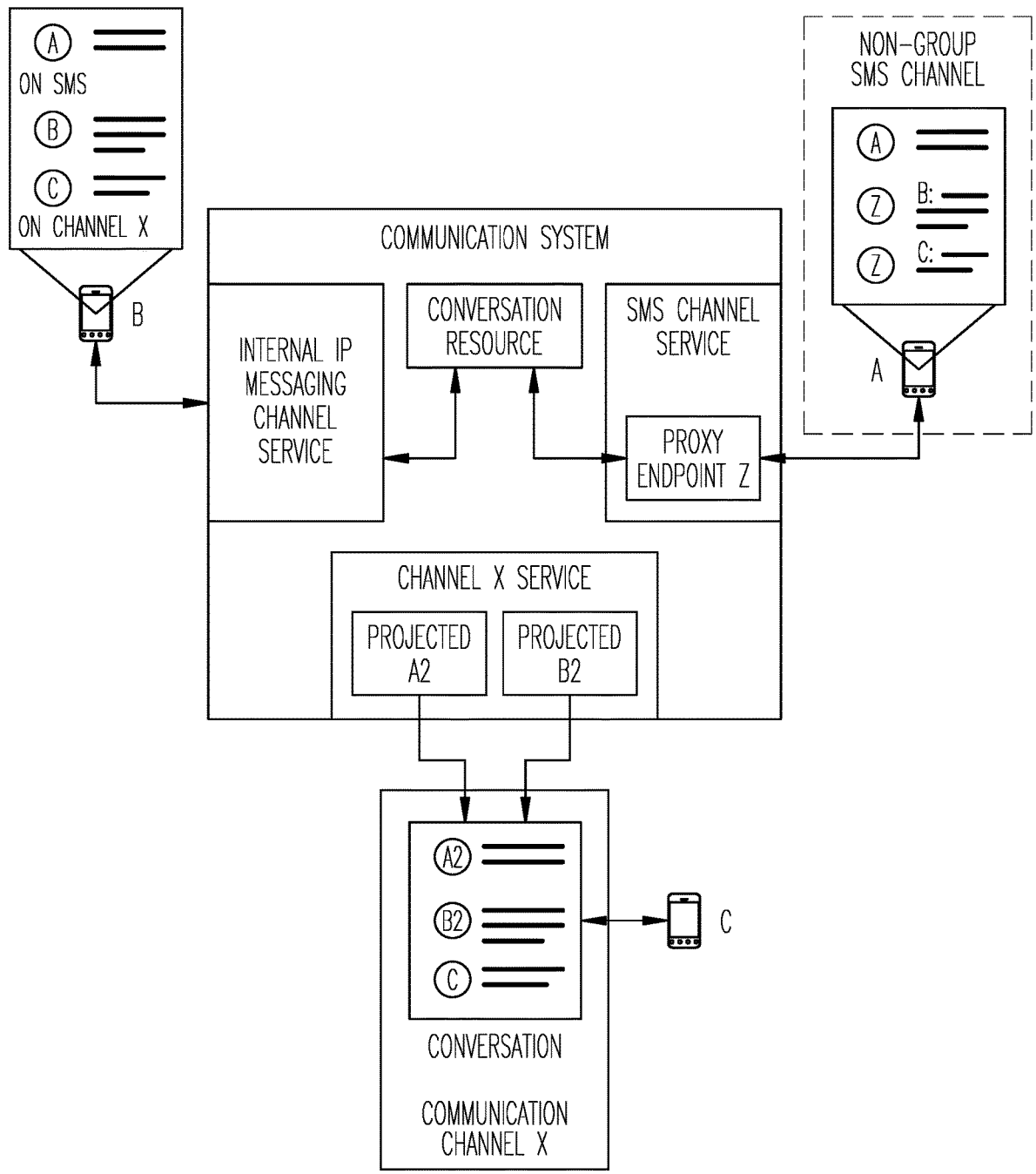
FIG. 15 is a diagram representation of a communication orchestration of an exemplary conversation instance involving a group-enabled communication channel, a group-limited communication channel, and an internal IP messaging communication channel.

As shown in FIG. 15, one exemplary instance may involve communicating with multiple types of communication channels. One conversation may make use of projected endpoints, proxy endpoints, and/or display endpoints. In the exemplary instance of FIG. 15, B is on an internal IP messaging/chat communication service using display endpoints to represent other participants A and C; C is on a group-enabled communication channel with which projected endpoints are used to individually represent the other participants B and A; and A is on a group-limited communication channel where a proxy endpoint is used to relay the group messages of both B and C to A.

Figure 16:
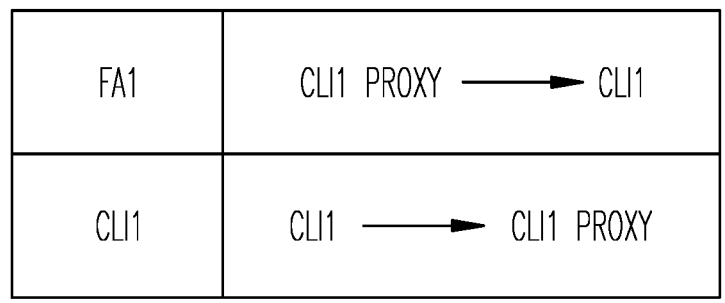
FIGS. 16-18 are graphical depictions of exemplary conversation scenarios indicating telephony communication between participant endpoints and intermediary endpoints.
Figure 17:
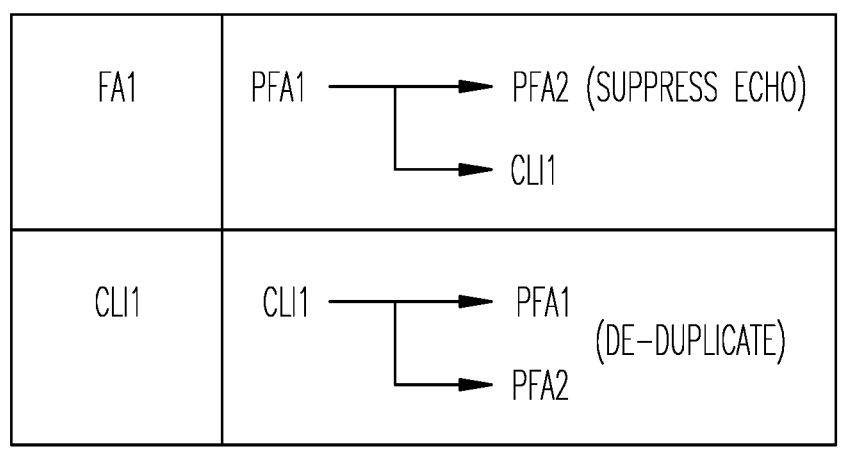
Figure 18:
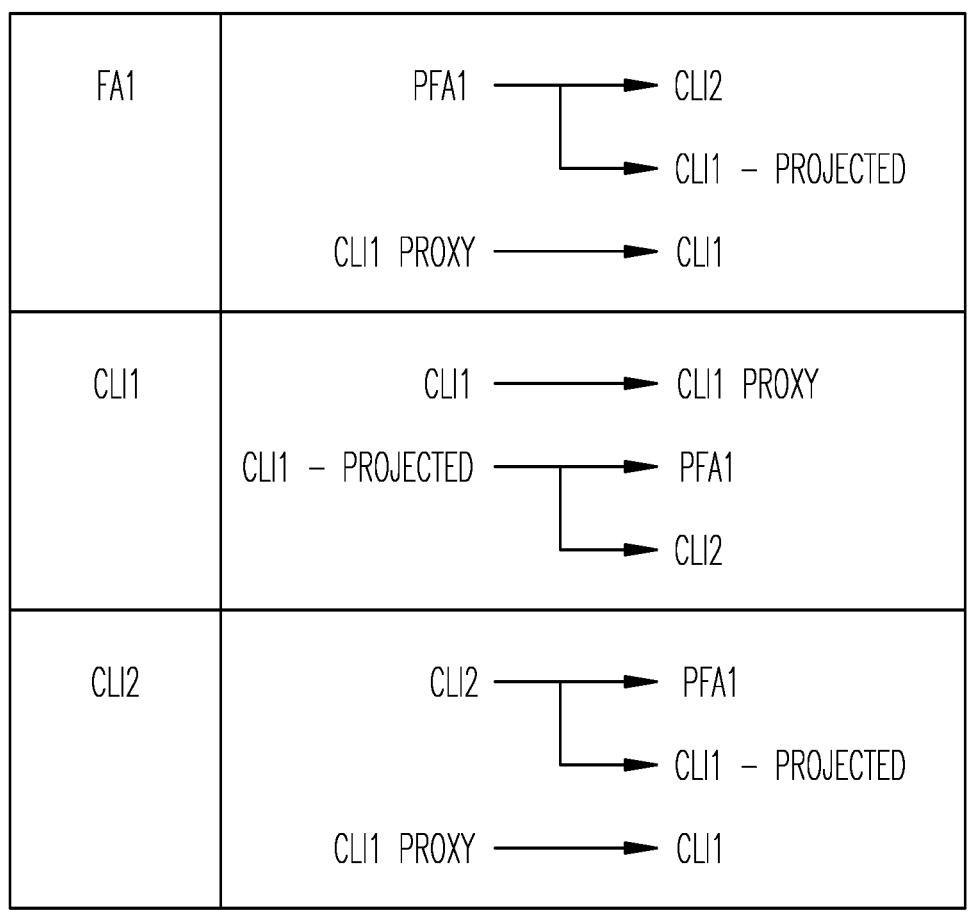

FIGS. 16-18 show exemplary scenarios involving applications of the method to scenarios where one or more financial advisors are communicating with their clients. Depending on the nature of the participant endpoints, different communication events occur depending on who is sending a message. In some cases, messages are transmitted by the communication system and in other cases messages are received at managed endpoints of the communication system. FIGS. 16-18 outline different telephony communications made through SMS/MMS communication channels.

As shown in FIG. 16, one exemplary instance may involve a conversation between a first financial advisor using a chat endpoint (FA1), a second financial advisor using a chat endpoint (FA2), and a client using a non-group SMS endpoint (Cli1). The first and the second financial advisors are preferably configured with projected phone numbers PFA1 and PFA2. A Cli1 proxy is configured for communication with Cli1. In a first scenario when FA1 sends a message, the Cli1 proxy endpoint is used to send the message to Cli1 in the non-group SMS channel. The message is also routed to FA2 within the chat channel. In a scenario when the client sends a message, the message is communicated within the SMS network and received by the Cli1 proxy endpoint. As a managed endpoint by the communication system, the communication system can then route the message to FA1 and FA2 via the IP chat channel.

As shown in FIG. 17, one exemplary instance may involve a conversation between a first financial advisor using a chat endpoint (FA1), a second financial advisor using a chat endpoint (FA2), and a client using a group SMS endpoint (Cli1). The first and the second financial advisors are preferably configured with projected phone numbers PFA1 and PFA2.

In a first scenario, the first financial advisor sends a message, and the PFA1 is used to send to PFA2 and to Cli2. The message is sent to PFA2 as part of communicating in the group SMS channel. However, since PFA2 is a managed endpoint, the message will also be received by the communication system and so echo suppression is preferably used.

In a second scenario, the client sends a message, and the message is natively transmitted to the PFA1 and PFA2 within the group SMS channel. The message may be received by the communication system on both endpoints, PFA1 and PFA2. The communication system preferably applies a de-duplication process to process the message only once. For example, only one of PFA1 or PFA2 may be monitored for inbound communications.

As shown in FIG. 18, one exemplary instance may involve a conversation between a financial adviser using a chat communication channel (FA1), a first client using a non-group SMS endpoint (Cli1), and a second client using a group SMS endpoint (Cli2). The financial advisor can be assigned a projected phone number (PFA1). The first client may be assigned a proxy endpoint used for participating in the conversation and projected endpoint to represent the first client in the group SMS.

In a first scenario, the financial adviser sends a message, which is received by the communication system and then sent to the other participants by transmitting from PFA1 to Cli2 and to the projected Cli1. Sending to the projected Cli1 causes the first client to appear as a native participant in the group SMS. At the same time, the Cli1 proxy is used to send the message to Cli1.

In a second scenario, the first client sends a message. This message is sent to the Cli1 proxy, which is preferably a managed endpoint and is received by the communication system. Then the projected Cli1 for group SMS is used to transmit the message to the projected PFA1 and Cli2. The message will also be transmitted to the chat client of FA1, which is not shown.

In a third scenario, the second client sends a message. This message is natively transmitted through the group SMS network so as to be received by PFA1 and the projected Cli1. The message is detected and deduplicated when received by the managed endpoints of PFA1 and the projected Cli1. Then message is then transmitted by the communication system using Cli1 proxy to Cli1 and similarly routed to the chat client of Fa1.

Other various communication scenarios may similarly be addressed by the method described herein. These examples are not intended to limit but to illustrate a small number of the type of group communications that can be facilitated through the method.

Software Architecture

Figure 19:
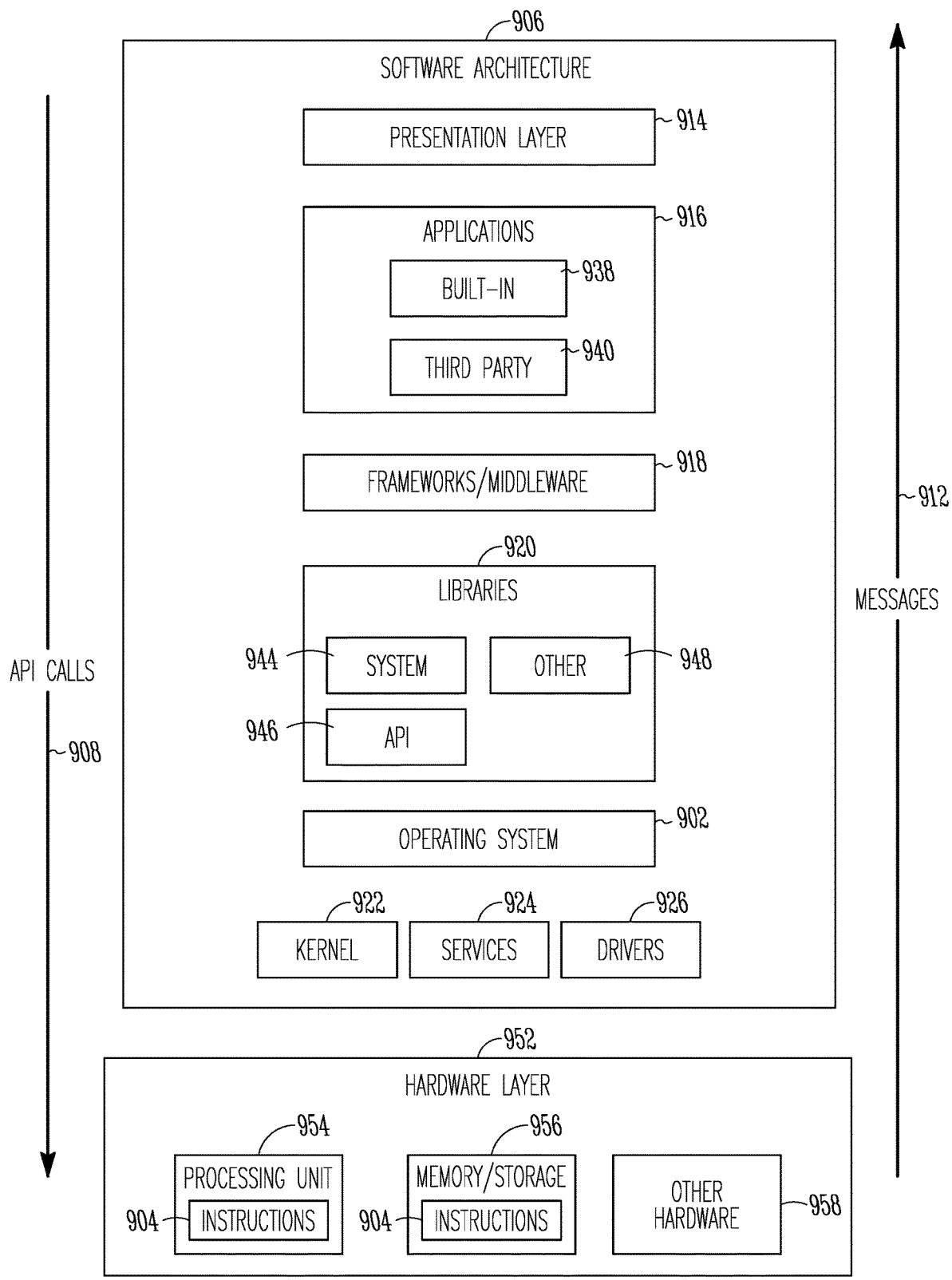
FIG. 19 is a block diagram illustrating components of a machine, according to some example embodiments, able to read instructions from a machine-readable medium (e.g., a machine-readable storage medium) and perform any one or more of the methodologies discussed herein.

FIG. 19 is a block diagram illustrating an example software architecture 906, which may be used in conjunction with various hardware architectures herein described. FIG. 19 is a non-limiting example of a software architecture 906 and it will be appreciated that many other architectures may be implemented to facilitate the functionality described herein. The software architecture 906 may execute on hardware such as machine 1000 of FIG. 20 that includes, among other things, processors 1004, memory 1014, and (input/output) I/O components 1018. A representative hardware layer 952 is illustrated and can represent, for example, the machine 1000 of FIG. 20. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 19, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 20:
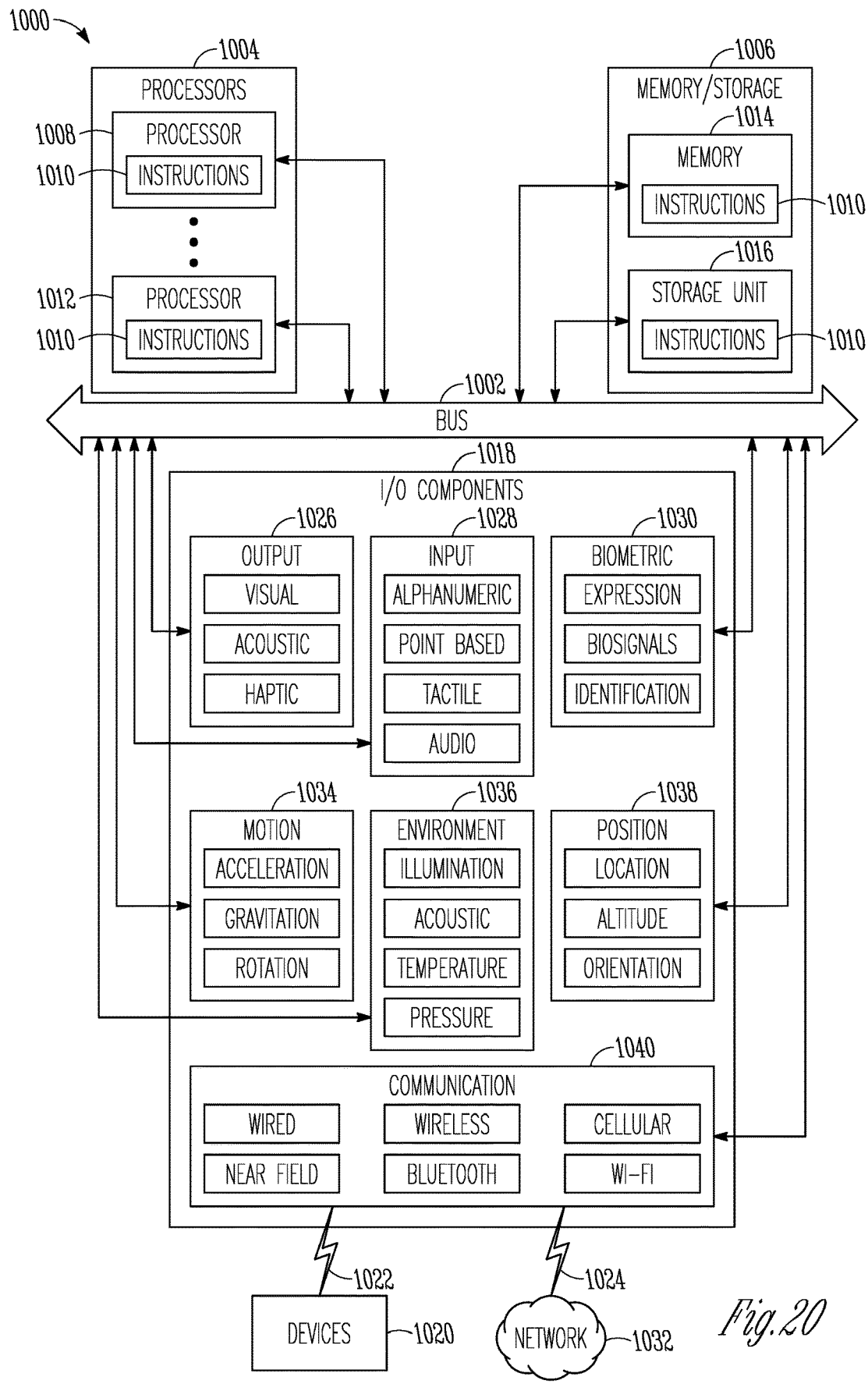
FIG. 20 is a block diagram illustrating components of a machine, according to some example embodiments, able to read instructions from a machine-readable medium (e.g., a machine-readable storage medium) and perform any one or more of the methodologies discussed herein.

FIG. 20 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 20 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 20. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

Figure 21:
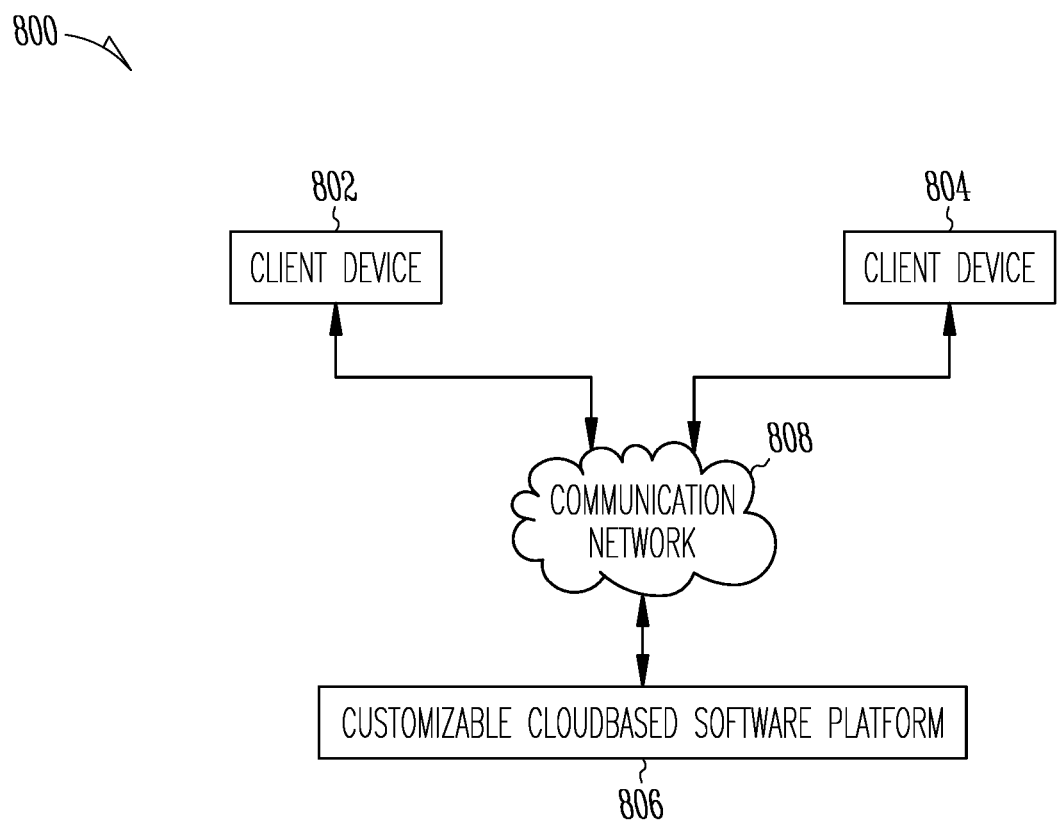
FIG. 21 is a system configuration for clients and a software platform communicating through a network.

"CLIENT DEVICE" in this context refers to any machine 1000 that interfaces to a communications network 1032 to obtain resources from one or more server systems or other client devices 802, 804 such as shown in FIG. 21. A client device 802, 804 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 416 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:

1. A method comprising:
   determining that, within a set of participant endpoints of a multi-channel group conversation, there is a first subset of participant endpoints on a first communication channel which is a non-group communication channel, wherein the determining comprises assessing group communication capabilities of each communication channel of each participant endpoint of the set of participant endpoints, the group communication capabilities indicating at least in part whether a respective communication channel supports group communications;
   selecting a type of intermediary endpoint for the first subset of participant endpoints based on group communication capabilities of the first communication channel;
   assigning, based on the type of intermediary endpoint, a proxy intermediary endpoint to the first subset of participant endpoints; and
   exchanging messages through the proxy intermediary endpoint for messaging between the first subset of participant endpoints and a second subset of participant endpoints outside the first communication channel.

2. The method of claim 1, wherein exchanging the messages through the proxy intermediary endpoint comprises annotating content of each of the messages to the first subset of participant endpoints with an identifier of a sending participant endpoint.

3. The method of claim 1, further comprising: receiving a conversation initiation request through an application programming interface (API) and creating a conversation API resource for the multi-channel group conversation, wherein the conversation API request initiates the determining that there is the first subset of participant endpoints.

4. The method of claim 1, further comprising receiving an incoming message from one participant in the set of participant endpoints, wherein the receiving of the incoming message initiates the determining that there is the first subset of participant endpoints.

5. The method of claim 1, wherein the set of participant endpoints includes at least three participant endpoints from at least two distinct types of communication channels.

6. The method of claim 1, wherein the non-group communication channel is a group-limited short message service (SMS) communication channel.

7. The method of claim 1, wherein the non-group communication channel is a communication channel that does not support communications between a number of participants of the multi-channel group conversation.

8. The method of claim 1, further comprising assigning a projected intermediary endpoint for a participant endpoint not on a second communication channel based on the second communication channel supporting group conversations; and further comprising exchanging, using the projected intermediary endpoint, the messages between the participant endpoint and a third subset of participant endpoints that is on the second communication channel.

9. A non-transitory machine-readable storage medium comprising instructions that, when executed by one or more processors of a machine, cause the machine to perform operations comprising:
   determining that, within a set of participant endpoints of a multi-channel group conversation, there is a first subset of participant endpoints on a first communication channel which is a non-group communication channel, wherein the determining comprises assessing group communication capabilities of each communication channel of each participant endpoint of the set of participant endpoints, the group communication capabilities indicating at least in part whether a respective communication channel supports group communications;

selecting a type of intermediary endpoint for the first subset of participant endpoints based on group communication capabilities of the first communication channel;

assigning, based on the type of intermediary endpoint, a proxy intermediary endpoint to the first subset of participant endpoints; and exchanging messages through the proxy intermediary endpoint for messaging between the first subset of participant endpoints and a second subset of participant endpoints outside the first communication channel.

10. The non-transitory machine-readable storage medium of claim 9, wherein exchanging the messages through the proxy intermediary endpoint comprises annotating content of each of the messages to the first subset of participant endpoints with an identifier of a sending participant endpoint.

11. The non-transitory machine-readable storage medium of claim 9, the operations further comprising: receiving a conversation initiation request through an application programming interface (API) and creating a conversation API resource for the multi-channel group conversation, wherein the conversation API request initiates the determining that there is the first subset of participant endpoints.

12. The non-transitory machine-readable storage medium of claim 9, the operations further comprising receiving an incoming message from one participant in the set of participant endpoints, wherein the receiving of the incoming message initiates the determining that there is the first subset of participant endpoints.

13. The non-transitory machine-readable storage medium of claim 9, wherein the non-group communication channel is a group-limited short message service (SMS) communication channel.

14. The non-transitory machine-readable storage medium of claim 9, the operations further comprising assigning a projected intermediary endpoint for a participant endpoint not on a second communication channel based on the second communication channel supporting group conversations; and exchanging, using the projected intermediary endpoint, the messages between the participant endpoint and a third subset of participant endpoints that is on the second communication channel.

15. A system comprising:
one or more computer-readable mediums storing instructions that, when executed by one or more computer processors, cause a computing platform to perform operations comprising:
determining that, within a set of participant endpoints of a multi-channel group conversation, there is a first subset of participant endpoints on a first communication channel which is a non-group communication channel, wherein the determining comprises assessing group communication capabilities of each communication channel of each participant endpoint of the set of participant endpoints, the group communication capabilities indicating at least in part whether a respective communication channel supports group communications;

selecting a type of intermediary endpoint for the first subset of participant endpoints based on group communication capabilities of the first communication channel;

assigning, based on the type of intermediary endpoint, a proxy intermediary endpoint to the first subset of participant endpoints; and exchanging messages through the proxy intermediary endpoint for messaging between the first subset of participant endpoints and a second subset of participant endpoints outside the first communication channel.

16. The system of claim 15, wherein exchanging the messages through the proxy intermediary endpoint comprises annotating content of each of the messages to the first subset of participant endpoints with an identifier of a sending participant endpoint.

17. The system of claim 15, the operations further comprising: receiving a conversation initiation request through an application programming interface (API) and creating a conversation API resource for the multi-channel group conversation, wherein the conversation API request initiates the determining that there is the first subset of participant endpoints.

18. The system of claim 15, the operations further comprising receiving an incoming message from one participant in the set of participant endpoints, wherein the receiving of the incoming message initiates the determining that there is the first subset of participant endpoints.

19. The system of claim 15, wherein the non-group communication channel is a group-limited short message service (SMS) communication channel.

20. The system of claim 15, the operations further comprising assigning a projected intermediary endpoint for a participant endpoint not on a second communication channel based on the second communication channel supporting group conversations; and exchanging, using the projected intermediary endpoint, the messages between the participant endpoint and a third subset of participant endpoints that is on the second communication channel.

* * * * *